(12) United States Patent
Xiu et al.

(10) Patent No.: US 11,368,676 B2
(45) Date of Patent: Jun. 21, 2022

(54) MOTION COMPENSATED BI-PREDICTION BASED ON LOCAL ILLUMINATION COMPENSATION

(71) Applicant: VID SCALE, INC., Wilmington, DE (US)

(72) Inventors: Xiaoyu Xiu, San Diego, CA (US); Yuwen He, San Diego, CA (US); Yan Ye, San Diego, CA (US); Saurav Bandyopadhyay, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/960,455

(22) PCT Filed: Jan. 15, 2019

(86) PCT No.: PCT/US2019/013623
§ 371 (c)(1),
(2) Date: Jul. 7, 2020

(87) PCT Pub. No.: WO2019/143602
PCT Pub. Date: Jul. 25, 2019

(65) Prior Publication Data
US 2020/0336738 A1 Oct. 22, 2020

Related U.S. Application Data

(60) Provisional application No. 62/786,671, filed on Dec. 31, 2018, provisional application No. 62/647,273, (Continued)

(51) Int. Cl.
*H04N 19/105* (2014.01)
*H04N 19/132* (2014.01)
(Continued)

(52) U.S. Cl.
CPC ........... *H04N 19/105* (2014.11); *G06F 17/18* (2013.01); *H04N 19/132* (2014.11);
(Continued)

(58) Field of Classification Search
None
See application file for complete search history.

(56) References Cited

U.S. PATENT DOCUMENTS 10,805,631 B2 * 10/2020 Lee ..................... H04N 19/176
2014/0003522 A1    1/2014 Park et al.
(Continued)

FOREIGN PATENT DOCUMENTS

EP          2515542 A2     10/2012
WO      2017/197146 A1     11/2017
(Continued)

OTHER PUBLICATIONS

"JEM-7.0 Reference Software", Available at <https://jvet.hhi.fraunhofer.de/svn/svn_HMJEMSoftware/tags/HM-16.6-JEM-7.0>, 1 page.
(Continued)

*Primary Examiner* — Christopher G Findley
(74) *Attorney, Agent, or Firm* — Condo Roccia Koptiw LLP

(57) ABSTRACT

Systems, methods, and Instrumentalities are described herein for calculating local Illumination compensation (LIC) parameters for bi-predicted coding unit (CU). The LIC parameters may be used to generate adjusted samples for the current CU and to address local illumination changes that may exist among temporal neighboring pictures. LIC parameters may be calculated based on bi-predicted reference template samples and template samples for a current CU. Bi-predicted reference template samples may be generated based on reference template samples neighboring temporal (Continued)

reference CUs. For example, the bi-predicted reference template samples may be generated based on averaging the reference template samples. The reference template samples may correspond to template samples for the current CU. A CU may be or may include a coding block and/or a sub-block that may be derived by dividing the coding block.

20 Claims, 29 Drawing Sheets

Related U.S. Application Data filed on Mar. 23, 2018, provisional application No. 62/617,964, filed on Jan. 16, 2018.

(51) Int. Cl.
*H04N 19/159* (2014.01)
*H04N 19/176* (2014.01)
*H04N 19/186* (2014.01)
*H04N 19/30* (2014.01)
*G06F 17/18* (2006.01)

(52) U.S. Cl.
CPC ......... *H04N 19/159* (2014.11); *H04N 19/176* (2014.11); *H04N 19/186* (2014.11); *H04N 19/30* (2014.11)

(56) References Cited

U.S. PATENT DOCUMENTS

| | | | |
|---|---|---|---|
| 2014/0112392 A1 | 4/2014 | Lim et al. | |
| 2016/0165209 A1 | 6/2016 | Huang et al. | |
| 2018/0098086 A1* | 4/2018 | Chuang | H04N 19/43 |
| 2020/0154124 A1* | 5/2020 | Lee | H04N 19/51 |

FOREIGN PATENT DOCUMENTS

| | | |
|---|---|---|
| WO | 2018/067729 A1 | 4/2018 |
| WO | 2018/067732 A1 | 4/2018 |

OTHER PUBLICATIONS

Alshina et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.

Bross et al., "High Efficiency Video Coding (HEVC) Text Specification Draft 10 (For FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Chen et al., "Algorithm Description of Joint Exploration Test Model 7 (JEM 7)", JVET-G1001-V1, Editors, Joint Video Exploration Team (JVET) of ITU-T SG16 WP3 and ISO/IEC JTC 1/SC 29/WG 11, 7th Meeting: Torino, IT, Jul. 13-21, 2017, 50 pages.

Chen et al., "Coding Tools Investigation for Next Generation Video Coding", Qualcomm Incorporated, COM 16-C 806-E, International Telecommunication Union, Telecommunication Standardization Sector, Jan. 2015, pp. 1-7.

Chen et al., "Generalized Bi-Prediction for Inter Coding", JVET-C0047, InterDigital Communications, Inc., Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-4.

ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.

Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.

Lee et al., "AHG 10: Complexity Assessment on Illumination Compensation (IC)", JCT3V-G0114, National Cheng Kung University (NCKU), Joint Collaborative Team on 3D Video Coding Extensions of ITU-T SG 16 WP 3 and ISO/IEC JTC 1/SC 29/WG 11, 7th Meeting: San José, US, Jan. 11-17, 2014, pp. 1-12.

Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.

Seo et al., "Pixel Based Illumination Compensation", JCTVC-F417, Sejong University and SK telecom, Joint Collaborative Team on Video Coding (JCT-VC) of ITU-T SG16 WP3 and ISO/IEC JTC1/SC29/WG11,6th Meeting: Torino, IT, Jul. 14-22, 2011, pp. 1-8.

SMPTE, "VC-1 Compressed Video Bitstream Format and Decoding Process", SMPTE 421M, Apr. 2006, 493 pages.

Su et al., "CE4-Related: Generalized Bi-Prediction Improvements", JVET-L0197, MediaTek Inc., Joint Video Experts Team (JVET) of ITU-T SG 16 WP 3 and ISO/IEC JTC 1/SC 29/WG 11, 12th Meeting: Macao, CN, Oct. 3-12, 2018, pp. 1-3.

Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

Xiu et al., "Description of SDR, HDR and 360° Video Coding Technology Proposal by InterDigital Communications and Dolby Laboratories", JVET-J0015-V1, InterDigital Communications, Inc., Dolby Laboratories, Inc., Joint Video Experts Team (JVET) of ITU-T SG 16 WP 3 and ISO/IEC JTC1/SC 29/WG 11, 10th Meeting: San Diego, US, Apr. 10-20, 2018, 82 pages.

Liu et al., "Local Illumination Compensation", VCEG-AZ06, Qualcomm Incorporated, ITU—Telecommunications Standardization Sector, Study Group 16, Question 6, Video Coding Experts Group (VCEG), 52nd Meeting, Warsaw, Poland, Jun. 19-26, 2015, 5 pages.

* cited by examiner

MOTION COMPENSATED BI-PREDICTION BASED ON LOCAL ILLUMINATION COMPENSATION

CROSS-REFERENCE TO RELATED APPLICATIONS

This application is the National Stage Entry under 35 U.S.C. § 371 of Patent Cooperation Treaty Application No. PCT/US2019/013623, filed Jan. 15, 2019, which claims the benefit of U.S. Provisional Application Ser. No. 62/617,964 filed Jan. 16, 2018, U.S. Provisional Application Ser. No. 62/647,273 filed Mar. 23, 2018, and U.S. Provisional Application Ser. No. 62/786,671 filed Dec. 31, 2018, the contents of which are incorporated by reference herein.

BACKGROUND

Video coding systems may be used to compress video signals, e.g., to reduce the storage space and/or transmission bandwidth of such signals. There may be various types of video coding systems, such as block-based, wavelet-based, object-based systems, block-based hybrid video coding systems, and/or the like. Block-based video coding systems may support international video coding standards such as MPEG1/2/4 part 2, H.264/MPEG-4 part 10 AVC, VC-1, and/or High Efficiency Video Coding (HEVC).

SUMMARY

Systems, methods, and instrumentalities are disclosed herein for calculating local illumination compensation (LIC) parameters based on bi-predicted reference template samples and template samples. The calculated LIC parameters may be used to address local illumination changes that may exist among temporal neighboring pictures. For example, the calculated LIC parameters for a current coding unit (CU) may be used to generate adjusted samples for the current CU to address local illumination changes.

A video CU may be processed. For example, a video CU may be or may include a coding block or a sub-block. A sub-block may be derived by dividing the regular coding block. A current CU may be received in a video bitstream.

A current CU may be bi-predicted. Whether the current CU is bi-predicted may be determined. If the current CU is bi-predicted, reference template samples associated with the current CU may be identified. For example, reference template samples may neighbor temporal reference CUs of the current CU. The reference template samples may correspond to template samples for the current CU that neighbor the current CU. For example, the template samples for the current CU may be neighboring samples of the current CU. The reference template samples neighboring temporal reference CUs may be identified, for example based on motion vectors of the current CU.

Bi-predicted reference template samples may be generated based on the reference template samples. For example, the bi-predicted reference template samples may be generated based on averaging the reference template samples neighboring the temporal reference CUs. Reference template samples for a current CU may be identified. The reference template samples may neighbor temporal reference CUs of the current CU that correspond to template samples for the current CU.

Bi-predicted reference template samples may be used to calculate LIC parameters. For example, LIC parameters may be calculated based on the generated bi-predicted reference template samples and the template samples for the current CU. In examples, the UC parameters may be calculated by minimizing the differences between the bi-predicted reference template samples and the template samples for the current CU. The differences between the bi-predicted reference template samples and the template samples for the current CU may be minimized based on a least mean square error (LMSE) approach. In examples, the LIC parameters may be calculated based on a linear model approach using a minimum value and a maximum value associated with the bi-predicted reference template samples and the template samples for the current CU. The calculated UC parameters may be applied to the bi-predicted CU and generate an adjusted bi-predicted current CU.

LIC parameters may be applied at an overlapped block motion compensation (OBMC) stage. For example, whether a sub-block of the current CU is at a boundary of the current CU may be determined, if the sub-block of the current CU is at the boundary of the current CU, one or more neighboring sub-blocks of the sub-block may be identified. One or more motion vectors associated with the neighboring sub-blocks may be applied to a sample in the sub-block to derive one or more template reference samples. An OBMC-predicted sample may be generated based on the template reference samples. For example, an OBMC-predicted sample may be generated based on averaging the template reference samples. LIC parameters may be applied to the generated OBMC-predicted sample. In examples, the LIC parameters calculated at motion compensation stage may be cached in a memory or a buffer and may be used at the OBMC stage. In examples, the LIC parameters may be fetched from the memory or the buffer and may be used at the OBMC stage.

In examples, template samples for the current CU may be identified. The template samples may be subsampled. LIC parameters may be calculated based on the subsampled template samples. For example, template samples for the current CU may be identified among the subsampled template samples.

In examples, reference template samples used for LIC parameter calculation may be identified. The reference template samples may neighbor temporal reference CUs that correspond to template samples for the current CU. The reference template samples may be subsampled. LIC parameters may be calculated based on the subsampled reference template samples. The reference template samples used for the LIC calculation (e.g., neighboring temporal reference CUs that correspond to the template samples for the current CU) may be identified from the subsampled reference template samples.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Video coding systems may compress digital video signals, for example, to reduce the storage space and/or transmission bandwidth associated with the storage and/or delivery of such signals. Video coding systems may include a block-based system, a wavelet-based system, an object-based system, and/or the like. Block-based video coding systems may support international video coding standards, such as MPEG-1/2/4 part 2, H.264/MPEG4 part 10 AVC, VC-1, and/or High Efficiency Video Coding (HEVC).

HEVC may provide bit-rate saving (e.g., an approximately 50%) or equivalent perceptual quality compared to a prior generation of video coding techniques (e.g., H.264/MPEG AVC). Superior coding efficiency may be achieved (e.g., with additional coding tools) over HEVC. Software codebases such as Joint Exploration Model (JEM) may be based on an HEVC Model (HM). Coding tools may be integrated into JEM software and may be tested, for example, using JVET common test conditions (CTCs). HM and/or JEM software may be based on a block-based hybrid video coding framework.

Figure 1:
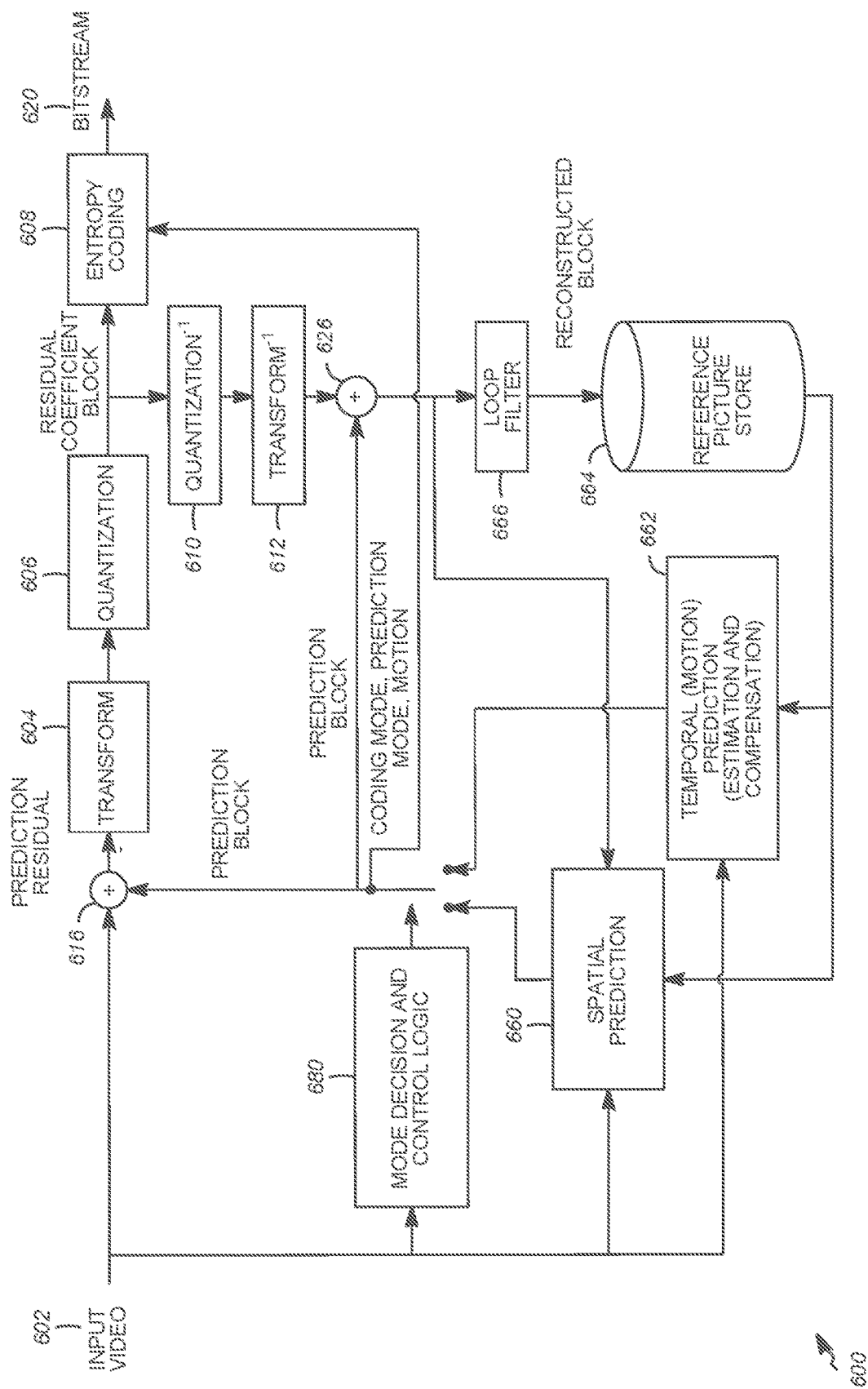
FIG. 1 is a diagram illustrating an example of a block-based hybrid video encoding system.

FIG. 1 shows an example of a block-based hybrid video encoding system 600. Input video signal 602 may be processed on a coding unit (CU) basis. A CU may include one or more video blocks or sub-blocks. A CU (e.g., a video block or sub-block) may be associated with a specific size (e.g., number of pixels) and may be used (e.g., in HEVC) to compress high resolution (e.g., 1080p and beyond) video signals. A CU may include, for example, 64×64 pixels. A CU may be partitioned (e.g., into prediction units (PU)). Separate (e.g. the same or different) prediction procedures may be applied to PUs. Spatial prediction 660 and/or temporal prediction 662 may be performed, for example, for an (e.g., each) input video block (e.g., a macroblock (MB) or a CU).

Spatial prediction (e.g., infra prediction) may predict a current video block, for example, by using pixels from samples of one or more already coded neighboring blocks (e.g., reference samples). The current video block and the one or more already coded neighboring blocks may be in a same video picture or video slice. Spatial prediction may reduce spatial redundancy that may be inherent in a video signal. Temporal prediction (e.g., inter prediction, motion compensated prediction, etc.) may predict a current video block, for example, by using reconstructed pixels from one or more already coded video pictures. Temporal prediction may reduce temporal redundancy that may be inherent in a video signal. A temporal prediction signal for a given video block may be signaled, for example, by one or more motion vectors (MVs), which may indicate an amount of motion and/or a direction of motion between a current block and a reference block. A reference picture index may be sent (e.g., for each video block), for example, when multiple reference pictures may be supported (e.g., for H.264/AVC or HEVC). A reference index may be used to identify a reference picture (e.g., in reference picture store 664) from which a temporal prediction signal may be derived.

A mode decision and control logic unit 680 in an encoder may (e.g., after spatial and/or temporal prediction) choose a (e.g. the best) prediction mode based on, for example, a rate-distortion optimization procedure. A prediction block may be subtracted from a current video block 616. A prediction residual may be de-correlated (e.g., at a transform unit 604) and quantized (e.g., at a quantization unit 606). Quantized residual coefficients may be inverse quantized (e.g., at 610) and inverse transformed (e.g., at 612), e.g., to form reconstructed residuals. Reconstructed residuals may be added back to the prediction block 626, for example, to form a reconstructed video block. In-loop filtering (e.g. deblocking filter and/or Adaptive Loop Filters) may be applied (e.g., by a loop filter 666) to a reconstructed video block, for example, before it is put in the reference picture store 664. The reconstructed video block may be used to code future video blocks. The coding mode information (e.g., inter or intra), prediction mode information, motion information, and/or quantized residual coefficients may be sent to an entropy coding unit 608. One or more of the information may be compressed and packed by the entropy coding unit 608 into an output bitstream 620.

Figure 2:
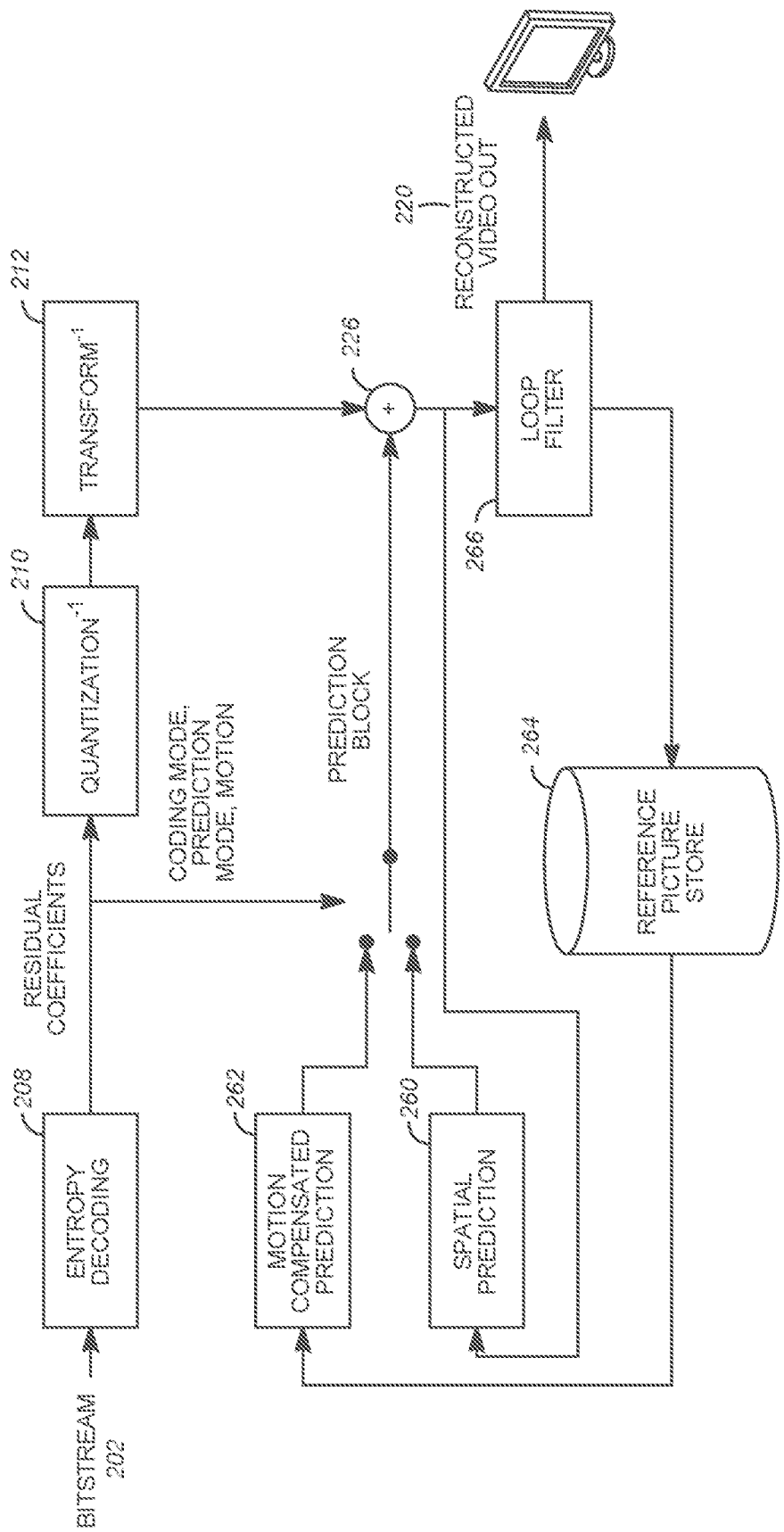
FIG. 2 is a diagram illustrating an example of a block-based video decoder.

FIG. 2 shows an example of a block-based video decoding system (e.g., a video decoder). A video bit-stream 202 may be unpacked and entropy decoded at an entropy decoding unit 208. Coding mode and/or prediction mode information may be sent to a spatial prediction unit 260 (e.g., when intra coded) or to a temporal prediction unit such as a motion compensated prediction unit 262 (e.g., when inter coded), for example, to form a prediction block. Residual transform coefficients may be provided to an inverse quantization unit 210 and an inverse transform unit 212, e.g., to reconstruct a residual block. The prediction block and residual block may be added together, e.g., via a summation operation at 226. In-loop filtering 266 may be applied to the reconstructed block, for example, before it is stored in a reference picture store 264. The reconstructed video 220 may be sent out (e.g., from the reference picture store 264) to drive a display device and/or to predict future video blocks.

A coding system may implement the example encoding/decoding workflows shown in FIGS. 1 and 2. A coding system may include one or more of the functional units shown in FIGS. 1 and 2, such as a spatial prediction unit (e.g., for intra prediction), a temporal prediction unit (e.g., for inter prediction), a transform unit, a quantization unit an entropy coding unit, and/or a loop filter.

In examples (e.g., when motion compensated prediction is used), motion information (e.g., motion vector (MV) and/or reference picture index) may be used (e.g., for each inter-coded block) to trace a corresponding matching block in a corresponding reference picture (e.g., which may be synchronized between an encoder and a decoder). Multiple modes (e.g., two modes) may be used to code the motion information of an inter block, for example, to reduce the overhead associated with sending motion information in a bit-stream. The modes may include a merge mode and a non-merge mode, for example. If a block is coded using the non-merge mode, a MV may be coded (e.g., differentially coded) using a MV predictor and the difference between the MV and the MV predictor may be transmitted to a decoder, if a block is coded using the merge mode, the motion information of the block may be derived from spatial and/or temporal neighboring blocks, and a competition based scheme may be applied to select a motion (e.g., the best motion) based on a group of candidate blocks. The index of the selected motion (e.g., the best candidate) may be sent to re-establish the same motion information at a decoder.

Local illumination compensation (LIC) may be used to address local illumination changes. The local illumination changes may exist among temporal neighboring pictures, for example. LIC may be based on a linear model. LIC may apply a scaling factor and an offset to reference samples. For example, LIC may apply a scaling factor and an offset to reference samples and may obtain the prediction samples of a current block. LIC may be represented by a mathematical equation such as the following:

$$P(x,y) = \alpha \cdot P_r(x+v_x, y+v_y) + \beta \quad (1)$$

where $P(x, y)$ may be a prediction signal of a current block at coordinates $(x, y)$. $P_r(x+v_x, y+v_y)$ may be a reference block pointed by a motion vector $(v_x, v_y)$. LIC parameters $\alpha$ and $\beta$ may represent a scaling factor and an offset respectively, that may be applied to the reference block.

Figure 3:
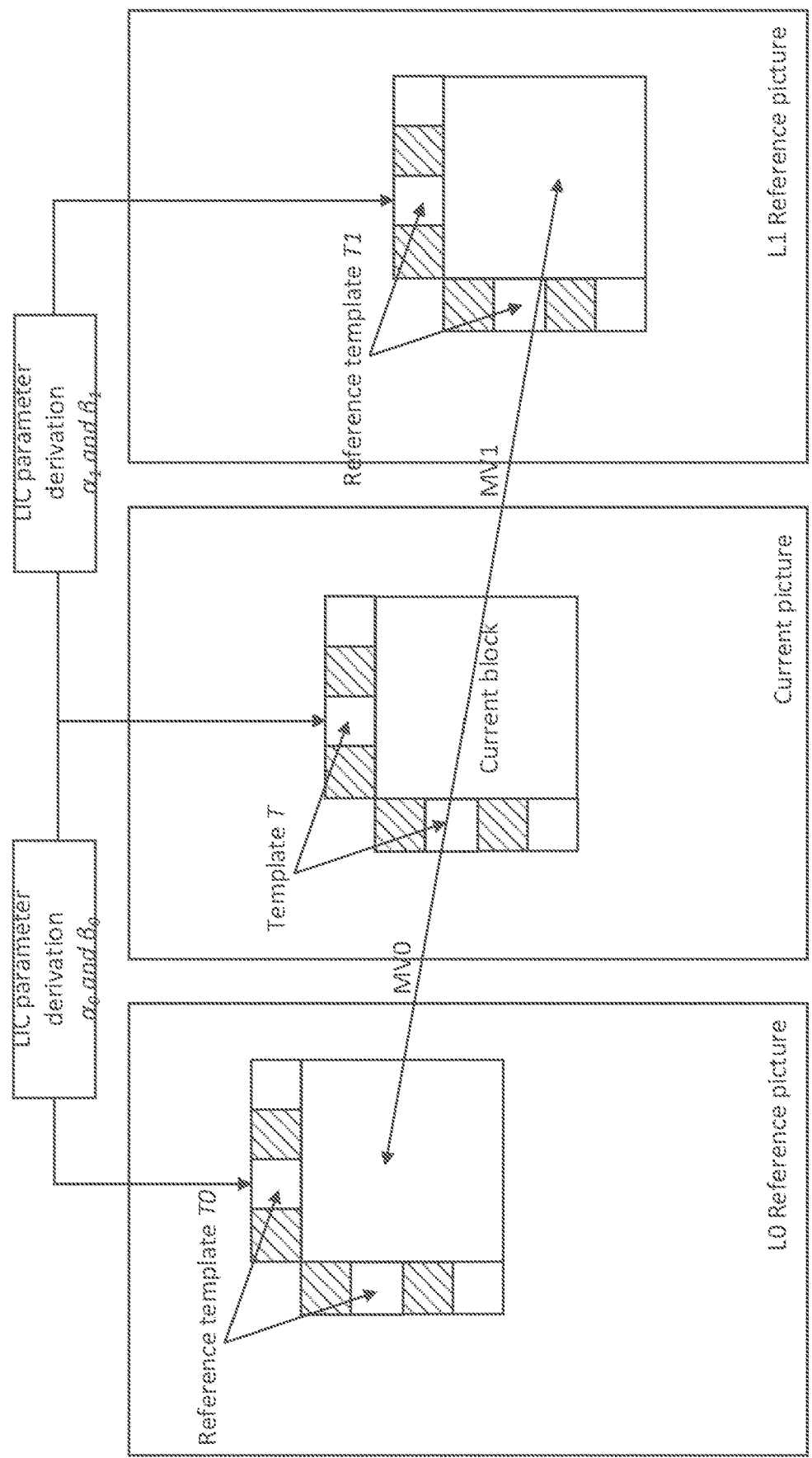
FIG. 3 is a diagram illustrating an example local illumination compensation (LIC) process.

FIG. 3 is a diagram illustrating example LIC operations. As shown, when LIC is applied for a video block, such as a CU, a least mean square error (LMSE) approach may be employed to derive the LIC parameters (e.g., $\alpha$ and $\beta$). The process may include minimizing the differences between neighboring samples of a current block (e.g., template samples in template T, as shown in FIG. 3) and their corresponding reference samples in one or more temporal reference pictures (e.g., reference template samples such as T0 and/or T1, as shown in FIG. 3). For example, the process may minimize the difference between template samples for a current block and reference template samples neighboring temporal reference CUs that correspond to the template samples for the current CU. This may be illustrated by equations (2) and (3):

$$\alpha_{0/1} = \frac{N \cdot \sum_{i=1}^{N} (T(x_i, y_i) \cdot T_{0/1}(x_i + v_x^{0/1}, y_i + v_y^{0/1})) - \sum_{i=1}^{N} (T(x_i, y_i)) \cdot \sum_{i=1}^{N} (T_{0/1}(x_i + v_x^{0/1}, y_i + v_y^{0/1}))}{N \cdot \sum_{i=1}^{N} (T(x_i, y_i) \cdot T_{0/1}(x_i + v_x^{0/1}, y_i + v_y^{0/1})) - \left( \sum_{i=1}^{N} T_{0/1}(x_i + v_x^{0/1}, y_i + v_y^{0/1}) \right)^2} \quad (2)$$

$$\beta_{0/1} = \frac{\sum_{i=1}^{N} (T(x_i, y_i)) - \alpha_{0/1} \cdot \sum_{i=1}^{N} (T_{0/1}(x_i + v_x^{0/1}, y_i + v_y^{0/1}))}{N} \quad (3)$$

where parameter N may represent the number of template samples that may be used to derive the LIC parameters. $T(x_i, y_i)$ may represent a template sample of the current block at coordinates $(x_i, y_i)$. $T_{0/1}(x_i+v_x^{0/1}, y_i+v_y^{0/1})$ may represent the reference samples that corresponds to the template sample (e.g., reference template samples) based on a motion vector (e.g., MV0 associated with L0, or MV1 associated with L1) associated with the current block. The template samples (e.g., for the current CU) and the reference template samples (e.g., that are neighboring temporal reference CUs) may be subsampled (e.g., via 2:1 subsampling) to derive the LIC parameters. For example, the shaded samples shown in FIG. 3 may be used to derive LIC parameters.

LIC parameters may be derived and applied for prediction directions, e.g., L0 and L1. In examples, when LIC is applied to bi-directional blocks or when a current block is predicted by two temporal prediction blocks, LIC parameters may be derived and applied for prediction directions, e.g., L0 and L1. The LIC parameters may be derived and applied (e.g., derived and applied separately) for different directions. FIG. 3 shows that based on the two motion vectors MV0 and MV1, two reference template samples T0 and T1 may be obtained. The corresponding pairs of LIC parameters in the two directions may be derived according to equations (2) and (3), for example, by separately minimizing the distortions between T0 and T, and between T1 and T. A bi-directional prediction signal (e.g., a bi-directional predicted signal) of the current block may be generated by combining two LIC uni-prediction blocks, as illustrated below:

$$P(x,y) = \frac{1}{2} \cdot (\alpha_0 \cdot P_r^0(x+v_x^0, y+v_y^0) + \beta_0 + \alpha_1 \cdot P_r^1(x+v_x^1, y+v_y^1) + \beta_1) \quad (4)$$

where $\alpha_0$ and $\beta_0$ may be the LIC parameters associated with the L0 motion vector $(v_x^0, v_y^0)$, $\alpha_1$ and $\beta_1$ may be the LIC parameters associated with the L1 motion vector $(v_x^1, v_y^1)$. $P_r^0(x+v_x^0, y+v_y^0)$ and $P_r^1(x+v_x^1, y+v_y^1)$ may be the corresponding temporal reference blocks of the current block from lists L0 and L1, respectively.

Motion compensation may be sub-block based. Sub-block level motion compensation approaches may include advanced temporal motion vector prediction (ATMVP), spatial-temporal motion vector prediction (STMVP), frame-rate up conversion (FRUC) mode, and/or the like. As described herein, a coding block may be associated with a motion vector for a prediction direction. A coding block may (e.g., in one or more of the aforementioned coding modes) be further split into multiple small sub-blocks, and motion information for a (e.g., each) sub-block may be derived separately. Sub-block motion information may be used, for example, to generate a prediction signal for a sub-block (e.g., and eventually the coding block) at the motion compensation stage. A coding unit referenced herein may be or may include a coding block or a sub-block. A CU may include multiple video processing and distribution units (VPDUs). For example, a CU may include multiple VPDUs depending on its size VPDU may process a region (e.g., 64×64 square region) before starting the processing of other regions (e.g., other 64×64 square regions). The VPDU may be included in a hardware implementation. The VPDU may impose one or more CU-split restrictions. For example, if the size of a parent block has greater than 64 samples in one direction, triple tree (TT) splitting may not be allowed. For example, if the size of a resulting child CU is smaller than 64 in one direction and greater than 64 in the other direction, binary tree (BT) splitting may not be allowed. A skilled person in the art will realize that CU or CU level used throughout the specification may include VPDU or VPDU level and CU or CU level may be used interchangeably with VPDU or VPDU level.

With ATMVP, temporal motion vector prediction may be improved, for example, by allowing a block to derive multiple motion information (e.g., information relating to motion vectors and reference indices) for sub-blocks in a current block. The motion information for the sub-blocks may be derived, for example, from corresponding small blocks of a temporal neighboring picture of the current picture. One or more of the following may be performed. A block, such as a collocated block, corresponding to the current block may be identified in a temporal reference picture (e.g., a collocated picture). The current block may be split into one or more sub-blocks. Motion information of the sub-blocks may be derived based on corresponding small blocks in the collocated picture.

Figure 4:
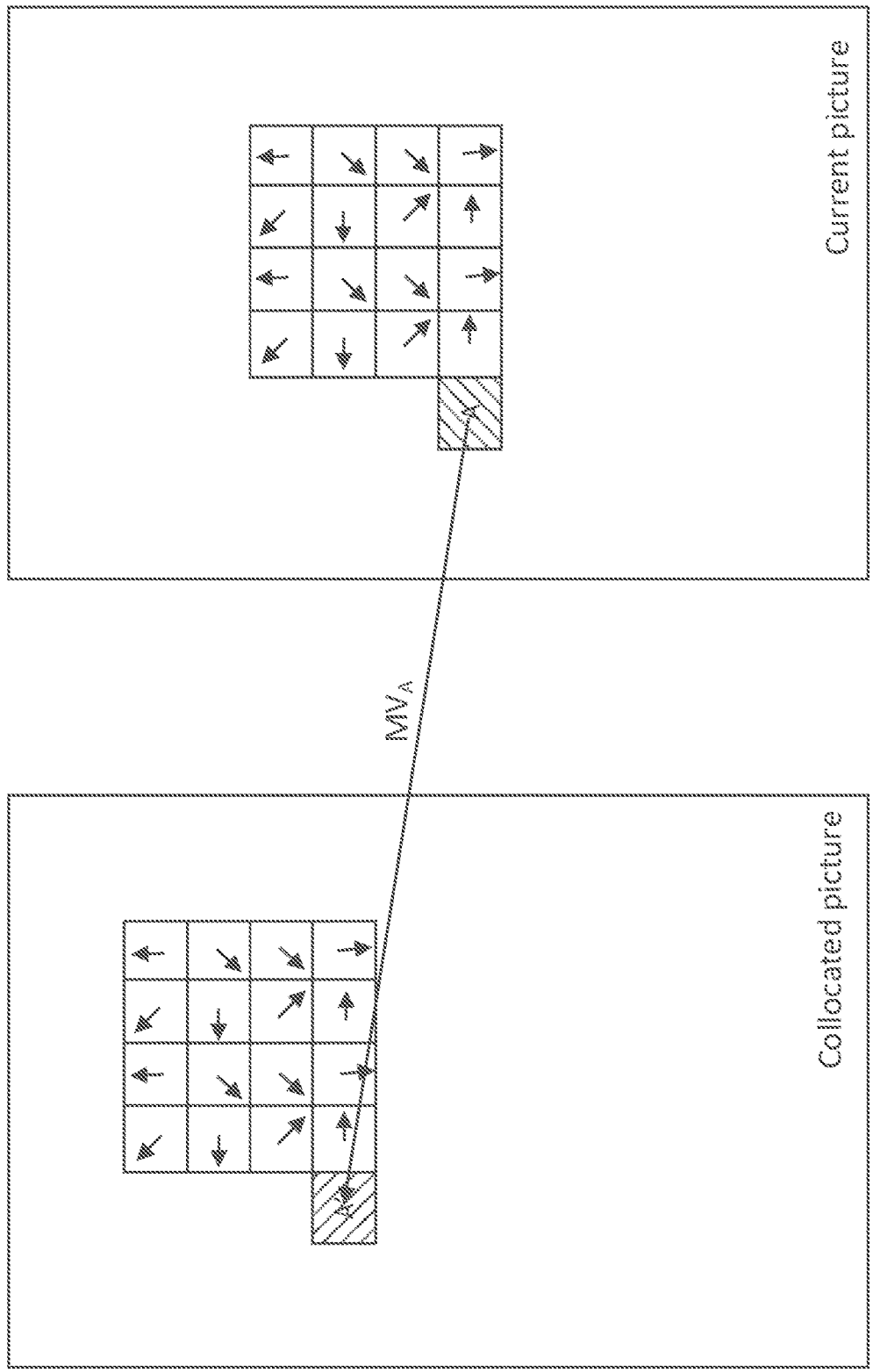
FIG. 4 is a diagram illustrating example advanced temporal motion vector prediction (ATMVP) operations.

FIG. 4 is a diagram illustrating example ATMVP operations. A collocated block and a collocated picture may be identified, for example, based on motion information associated with one or more spatial neighboring blocks of a current block, in examples, the first available candidate in a merge candidate list may be considered, as illustrated in FIG. 4. For example, a block A may be assumed to be the first available merge candidate of the current block based on a scanning order of a merge candidate list associated with the current block. A corresponding motion vector of block A (e.g., $MV_A$) and its reference index may be used to identify a collocated picture and a collocated block for the current block. The location of the collocated block in the collocated picture may be determined, for example, by adding the motion vector of block A (e.g., $MV_A$) to coordinates of the current block.

Motion information associated with a sub-block of the current block, may be derived, e.g., based on a corresponding small block of the sub-block (e.g., as indicated by the short arrows in FIG. 4) in the collocated block. This may occur for one or more sub-blocks in the current block, identified motion information of the (e.g., each) small block in the collocated block may be converted to a motion vector and a reference index for a corresponding sub-block in the current block. The conversion may be performed in a similar manner as temporal motion vector prediction (TMVP), for example where temporal motion vector scaling may be applied.

Figure 5:
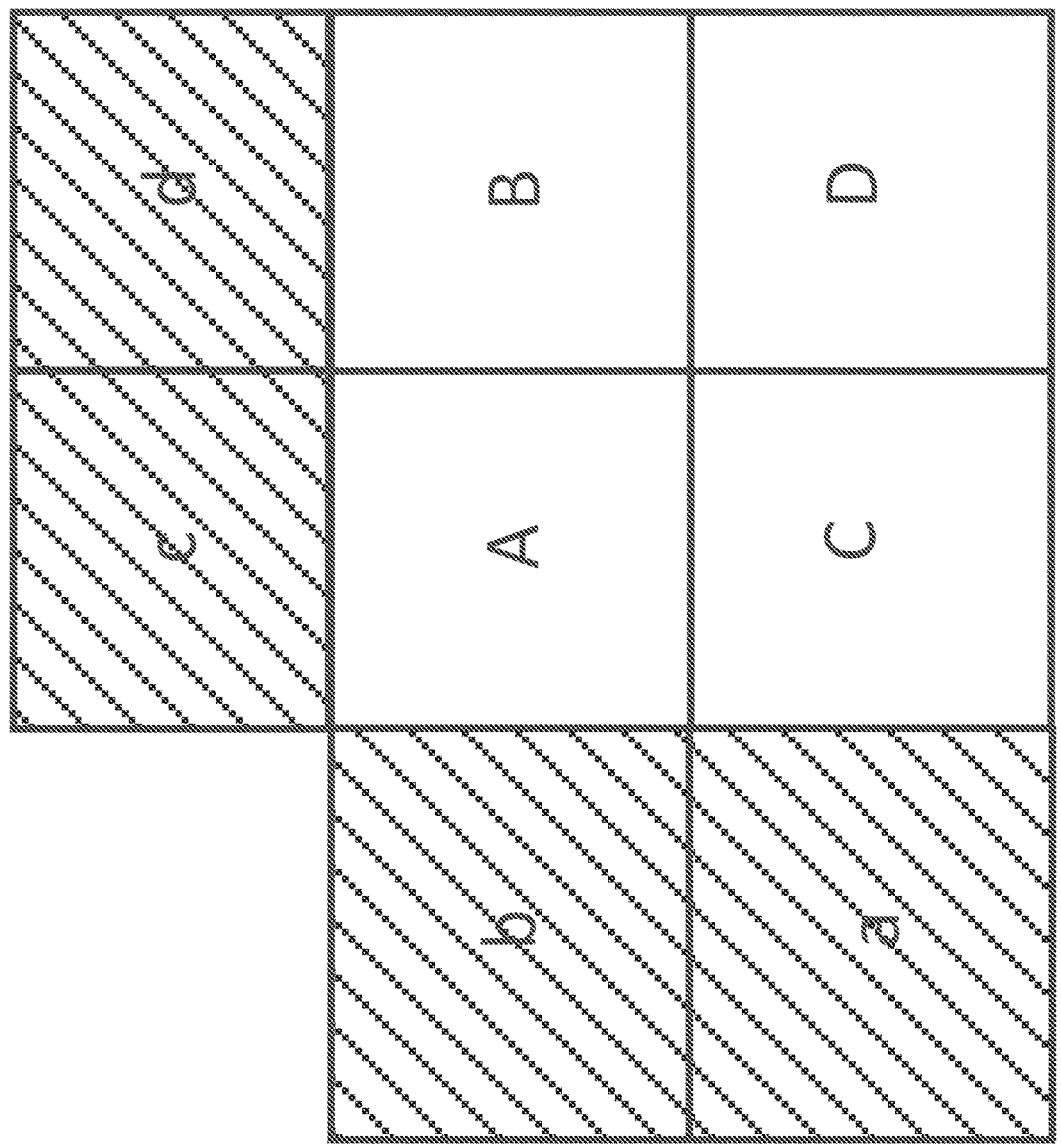
FIG. 5 is a diagram illustrating example spatial-temporal motion vector prediction (STMVP) operations.

Motion information associated with sub-blocks of a coding block may be derived in a recursive manner (e.g., in STVMP). FIG. 5 is a diagram illustrating example STMVP operations. For example, FIG. 5 shows that a current block may include four sub-blocks (e.g., A, B, C, and D). Neighboring small blocks (e.g., sub-blocks) of a current sub-block A (e.g., spatial neighbors of the sub-block A) may be labeled a, b, c, and d (e.g., shaded blocks shown in FIG. 5). The neighboring small blocks may have (e.g., each have) a same size as the current sub-block A. Motion derivation for the sub-block A may identify its spatial neighbors (e.g., two spatial neighbors). A first neighbor may be small block c, which may be located above the current sub-block A. If small block c is not available or is intra coded, one or more other neighboring small blocks (e.g., those above the current block) may be checked in a specific order (e.g., from left to right).

A second neighbor of sub-block A may be small block b, which may be located to the left of the current sub-block A. If small block b is not available or is intra coded, one or more other neighboring small blocks (e.g., those to the left of the current block) may be checked in a specific order (e.g. from top to bottom). Motion information associated with the one or more spatial neighbors of the sub-block A may be fetched. Motion information associated with one or more temporal neighbors of the sub-block A may be obtained, for example, by following a procedure similar to a TMVP process. Motion information associated with available spatial and temporal neighbors (e.g., up to three) may be averaged and used as motion information for the sub-block A. The STMVP process described herein may be repeated to derive motion information for the sub-blocks in the current video block. For example, the STMVP process may be repeated based on a raster scan order to derive motion information for the sub-blocks in the current video block.

FRUC may be performed, e.g., for inter-coded blocks. With FRUC, signaling motion information (e.g., information associated with motion vectors and/or reference indices) associated with a coded block may be skipped. Motion information may be derived at a decoder side, for example, using template-matching and/or bilateral-matching techniques. A merge candidate list associated with a current block and/or a set of preliminary motion vectors may be checked (e.g., during a motion derivation procedure at a decoder) to identify a candidate that may provide a minimum sum of absolute differences (SAD). The set of preliminary motion vectors may be generated based on one or more motion vectors associated with one or more temporal collocated blocks of the current block. The candidate may be selected as a starting point A local search around the starting point may be performed. For example, a local search may be based on template-matching, bilateral-matching, and/or the like. A MV that may result in the minimum SAD may be taken as an MV for the entire current block. Motion information may be refined at a sub-block level.

Figure 6A:
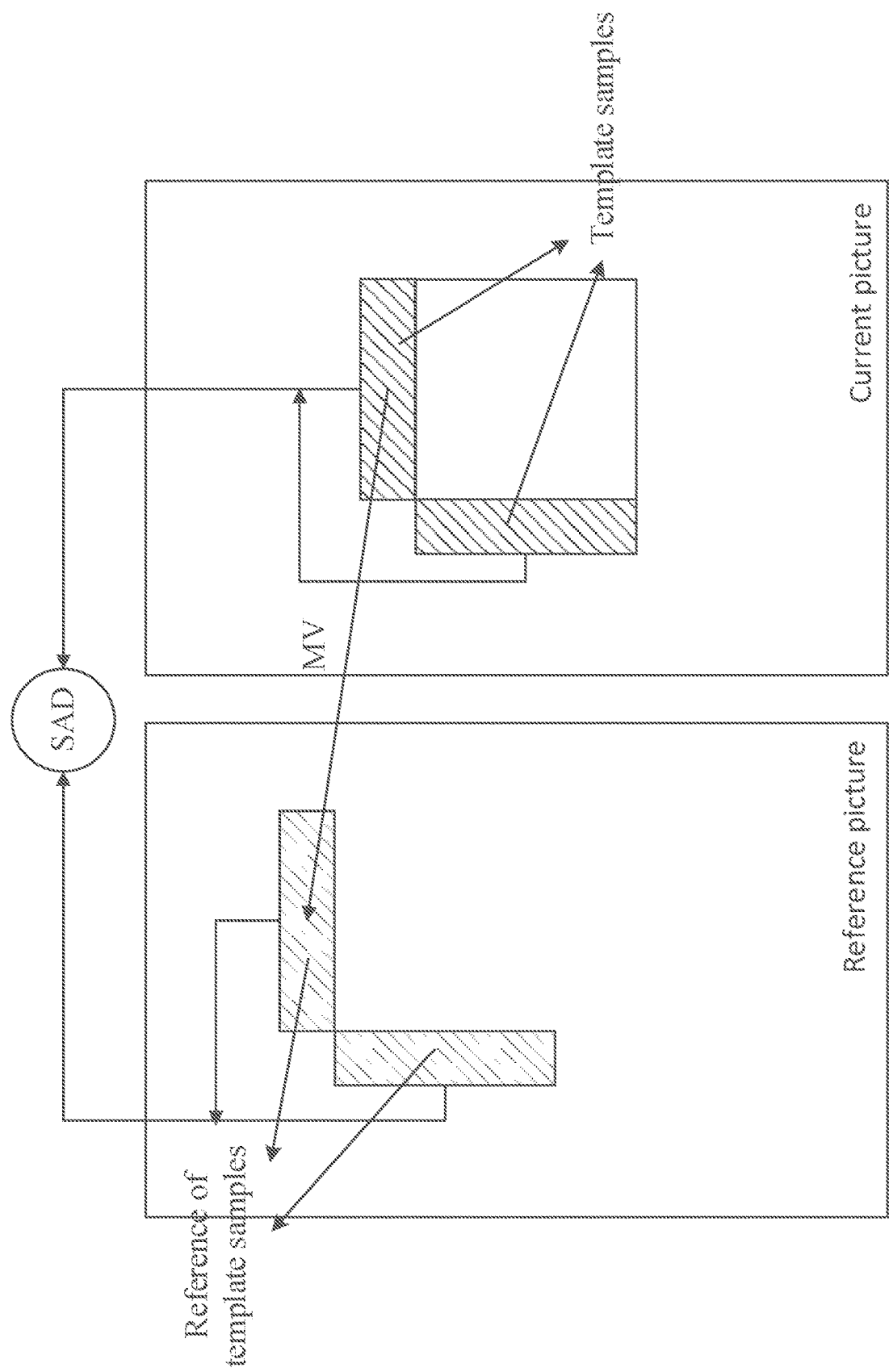
FIG. 6A is a diagram illustrating example frame-rate up conversion (FRUC) operations using template-matching.
Figure 6B:
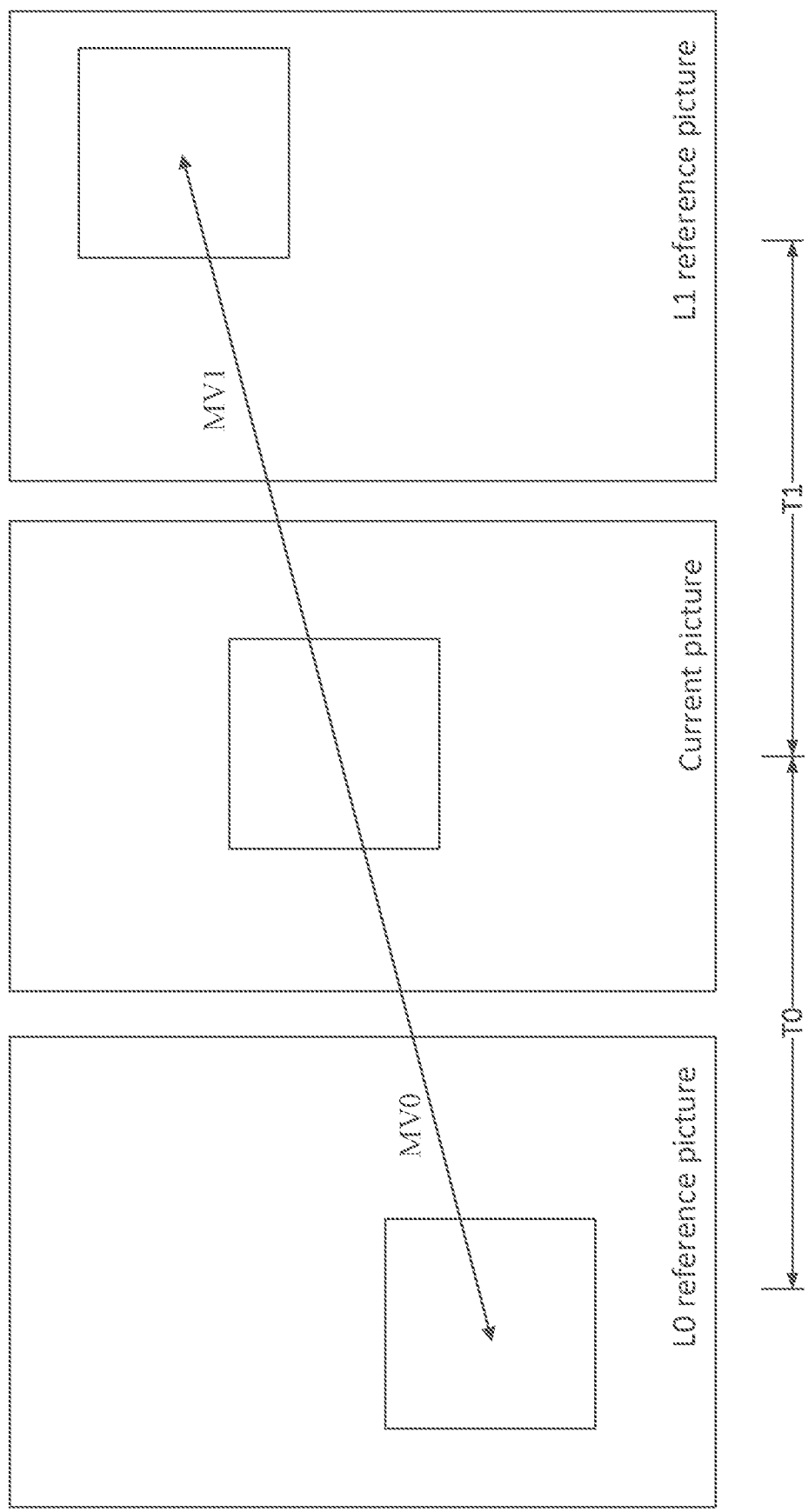
FIG. 6B is a diagram illustrating example FRUC operates using bilateral-matching.

FIG. 6A and FIG. 6B are diagrams illustrating examples of FRUC. FIG. 6A shows an example of template-matching. FIG. 6B shows an example of bilateral-matching. Template-matching (e.g., as shown in FIG. 6A) may be used to derive motion information of a current block, for example, by finding a match (e.g., the best match) between a template (e.g., top and/or left neighboring blocks of the current block) in a current picture and a block (e.g., which have the same size as the template) in a reference picture. Bilateral-matching (e.g., as shown in FIG. 6B) may be used to derive motion information of a current block, for example, by finding the best match between two blocks along a motion trajectory of the current block in multiple (e.g., two) different reference pictures. A motion search process of bilateral-matching may be based on motion trajectory. In examples, motion vectors (e.g., MV0 and MV1) pointing to reference blocks may be proportional to the temporal distances between a current picture and a (e.g., each) reference picture (e.g., T0 and/or T1).

A FRUC motion search (e.g., in the context of template-matching and bilateral-matching) may be performed. A CU-level motion search may be performed. An initial MV may be derived for a whole CU (e.g., a current CU). Motion information associated with the CU may be refined at a sub-block level, for example, using the derived CU-level MV as a starting point. The current CU may be split into one or more sub-blocks (e.g., M×M sub-blocks). The value of M may be calculated, for example, in accordance with equation (5) below:

$$M = \max\left(4, \min\left(\frac{w}{2^D}, \frac{h}{2^D}\right)\right) \quad (5)$$

where w and h may represent a width and a height of the current CU, respectively. Parameter D may be a predefined splitting depth, which may, for example, be set to 3 and signaled in a sequence parameter set (SPS).

Overlapped block motion compensation (OBMC) may be applied to remove blocking artifact at the motion compensation stage. OBMC may be performed for one or more (e.g., all) inter block boundaries except the right and bottom boundaries of a block. In examples, when a video block is coded in a sub-block mode (e.g., such as ATMVP, STMVP, FRUC, and/or the like), OBMC may be performed for one or more of the sub-block's boundaries (e.g., all four of the sub-blocks boundaries).

Figure 7:
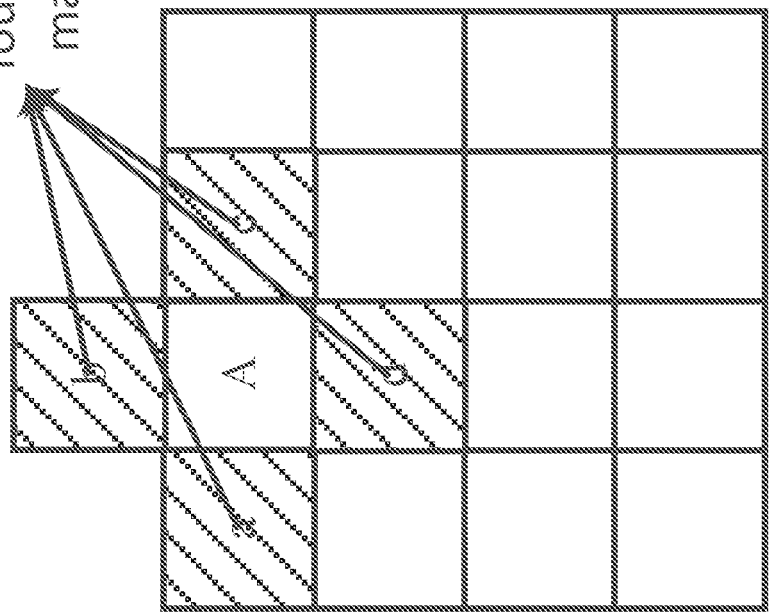
FIG. 7 is a diagram illustrating example overlapped block motion compensation (OBMC) operations.

FIG. 7 is a diagram illustrating example OBMC operations. OBMC may be applied to a sub-block (e.g., sub-block A in FIG. 7 and/or to the motion vector associated with the current sub-block). If OBMC is applied to a sub-block, motion vectors associated with neighboring sub-blocks (e.g., up to four neighboring sub-blocks) may be used to derive a prediction signal of the current sub-block. Prediction blocks using the motion vectors associated with the neighboring sub-blocks may be averaged to generate the prediction signal for the current sub-block.

A weighted average may be used in OBMC to generate a prediction signal for a block. A prediction signal using the motion vector of a neighboring sub-block may be denoted as PN A prediction signal using the motion vector of a current sub-block A may be denoted as PC. The samples (e.g., when OBMC is applied) in certain rows and/or columns (e.g., first and/or last four rows/columns) of PN may be weight averaged with the samples at the same positrons in PC. The samples to which weight averaging is applied may be determined for a corresponding neighboring sub-block. For example, the samples to which weight averaging is applied may be determined for a corresponding neighboring sub-block based on the location of the neighboring sub-block.

In examples, when a neighboring sub-block is above the current sub-block A (e.g., such as neighboring sub-block b in FIG. 7), the samples in the first X rows of the current sub-block may be adjusted. In examples, when a neighboring sub-block is below the current sub-block A (e.g., such as neighboring sub-block d in FIG. 7), the samples in the last X rows of the current sub-block may be adjusted. In examples, when a neighboring sub-block is to the left of the current sub-block (e.g., such as sub-block a in FIG. 7), the samples in the first X columns of the current block may be adjusted. In examples, when a neighboring sub-block is to the right of the current sub-block (e.g., such as sub-block c in FIG. 7), the samples in the last X columns of the current sub-block may be adjusted.

The values of X and/or the weights may be determined based on the coding mode used to code the current block. In examples, when the current block coding is skipped in a sub-block mode, weighting factors {1/4, 1/8, 1/16, 1/32} may be used for the first four rows/columns of PN and weighting factors {3/4, 7/8, 15/16, 31/32} may be used for the first four rows/columns of PC. In examples, when the current block is coded in sub-block mode, the first two rows/columns (e.g., only the first two rows/columns) of PN and PC may be averaged. In these examples, weighting factors {1/4, 1/8} may be used for PN and weighting factors {3/4, 7/8} may be used for PC.

Generalized bi-prediction (GBi) may improve motion compensated prediction for bi-prediction mode. In bi-prediction mode, prediction signal at sample x as shown in equation (6) may be calculated by:

$$P[x]=w_0*P_0[x+v_0]+w_1*P_1[x+v_1] \quad (6)$$

P[x] may denote prediction signal (e.g., resulting prediction signal) of a sample x located at a picture position x. $P_i[x+v_j]$ may indicate motion-compensated prediction signal of x using the motion vector (MV) $v_i$ for i-th list (e.g., list 0, list 1). Parameters $w_0$ and $w_1$ may indicate weight values shared across one or more (e.g., all) the samples in a block. Based on the equation (6), one or more prediction signals may be obtained, e.g., by adjusting the weight value, such as $w_0$ and $w_1$. For example, the weight values $w_0$ and/or $w_1$ may be configured to imply toe same prediction as uni-prediction and bi-prediction. The weight values may be configured to $(w_0, w_1)=(1, 0)$ for uni-prediction with reference list L0, $(w_0, w_1)=(0, 1)$ for uni-prediction with reference list L1, and $(w_0, w_1)=(0.5, 0.5)$ for the bi-prediction with two reference lists. The weight may be signaled per CU. Weight values may be set to $w_0+w_1=1$. In such a case, one weight (e.g., only one weight) may be signaled, and equation (6) may be simplified as shown in equation (7).

$$P[x]=(1-w_1)*P_0[x+v_0]+w_1*P_1[x+v_1] \quad (7)$$

Weight value $w_1$ may be discretized, e.g., {−1/4, 1/4, 3/8, 1/2, 5/8, 3/4, 5/4}. A weight value may be indicated by an index value within a range (e.g., a small limited range).

Figure 15:
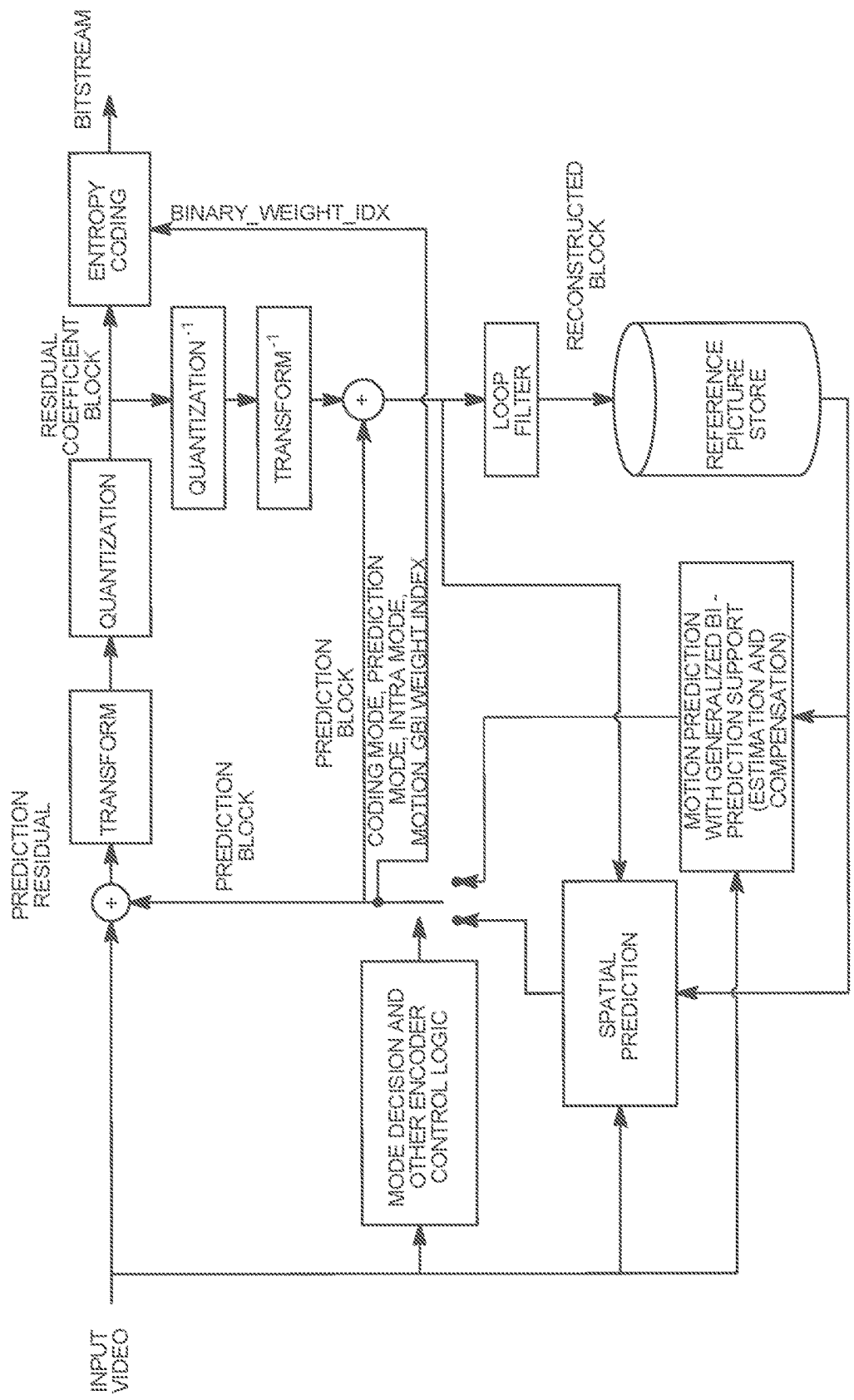
FIG. 15 illustrates an example block diagram of a video encoder with generalized bi-prediction (GBi) support.
Figure 16:
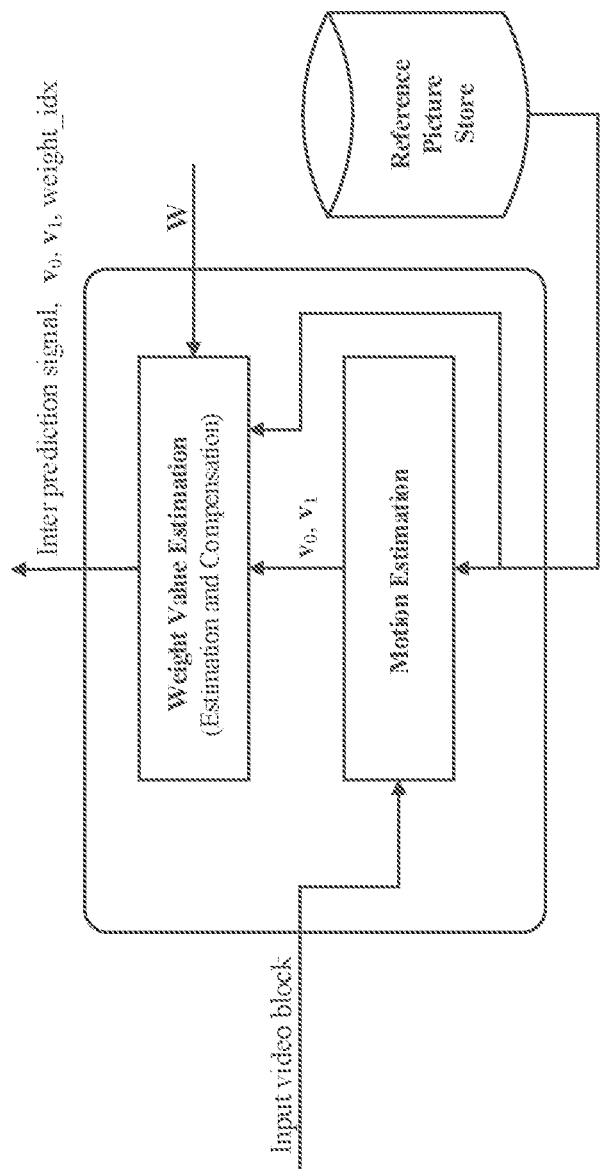
FIG. 16 illustrates an example block diagram of a GBi module.

FIG. 15 illustrates an example block diagram of a video encoder with GBi support. Similar to the video encoder shown in FIG. 1, spatial prediction and temporal prediction may be the two pixel-domain prediction modules in the video encoder shown in FIG. 15. The spatial prediction module may be similar (e.g., the same) as the one introduced in FIG. 1. The temporal prediction module for motion prediction in FIG. 1 may be enhanced with GBi support, e.g., by allowing bi-prediction to combine too separate prediction signals in a weighted-averaging manner. The selected weight index may be signaled in a bitstream. FIG. 16 illustrates an example block diagram of a bi-prediction module. As depicted in FIG. 16, a GBi estimation module may include a process to generate inter prediction signal. The GBi estimation module may perform motion estimation in a reference picture(s). For example, the GBi estimation module may search two motion vectors (MVs) (e.g., two optimal MVs) pointing to two reference blocks and may search for the weight index (e.g., optimal weight index), for example, to minimize the weighted bi-prediction error between the current video block and bi-prediction prediction.

The prediction signal of the generalized bi-prediction may be computed, e.g., as a weighted average of the two prediction blocks.

Figure 17:
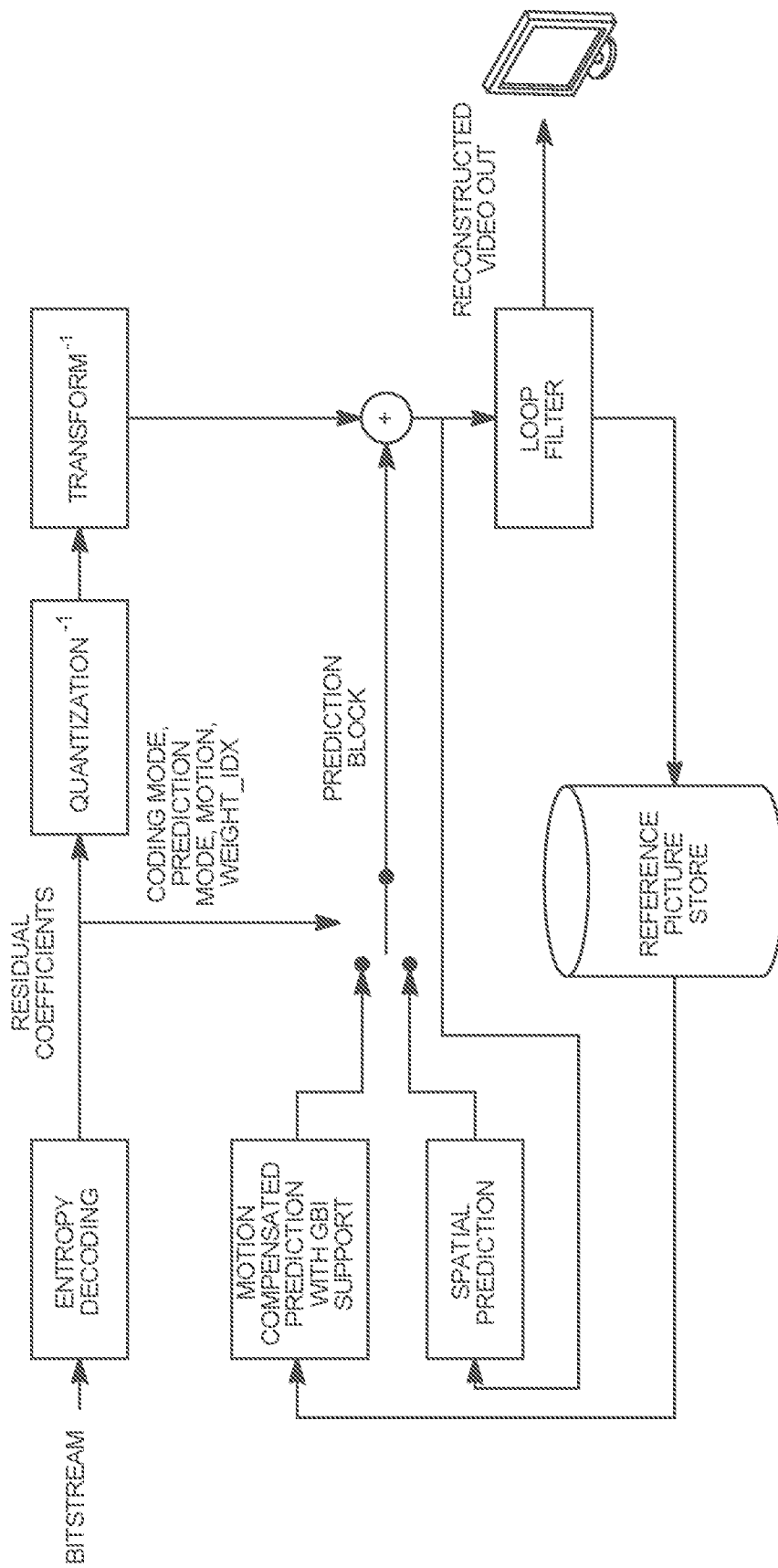
FIG. 17 illustrates an example block diagram of a video decoder that supports the GBi module.

FIG. 17 illustrates an example block diagram of a video decoder that supports the GBi module and decodes a bitstream produced by a video encoder (e.g., shown in FIG. 15). The coding mode and prediction information may be used to derive the prediction signal, e.g., using spatial prediction or motion compensated prediction (e.g., with generalized bi-prediction support). For the generalized bi-prediction, the block motion information and weight value (e.g., in the form of an index indicating the weight value) may be received and may be decoded, e.g., to generate the prediction block.

Figure 18:
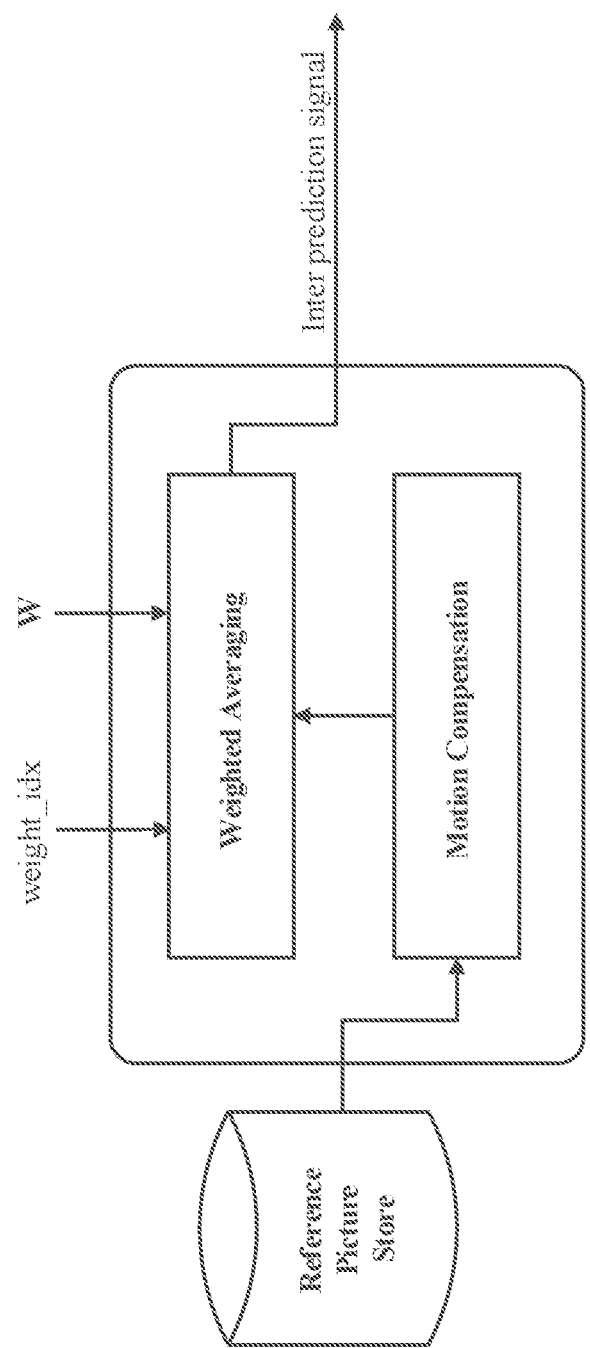
FIG. 18 illustrates an example block diagram of a GBi module.

With the block motion information and weight value the generalized bi-prediction module (e.g., as shown in FIG. 16) may compute the prediction signal of generalized bi-prediction, e.g., as a weighted average of the two motion compensated prediction blocks. FIG. 18 illustrates an example block diagram of a bi-prediction module. As shown in FIG. 18, the GBi estimation unit may include a weight value estimation unit and a motion estimation unit. The GBi estimation unit may generate inter prediction signal, such as a final inter prediction signal. The weight value estimation unit may search tor weight index (e.g., the optimal weight index) to minimize the weighted bi-prediction error between the current video block and bi-prediction prediction.

GBi described herein may be or may include bi-predictive weighted averaging (BPWA).

Figure 8A:
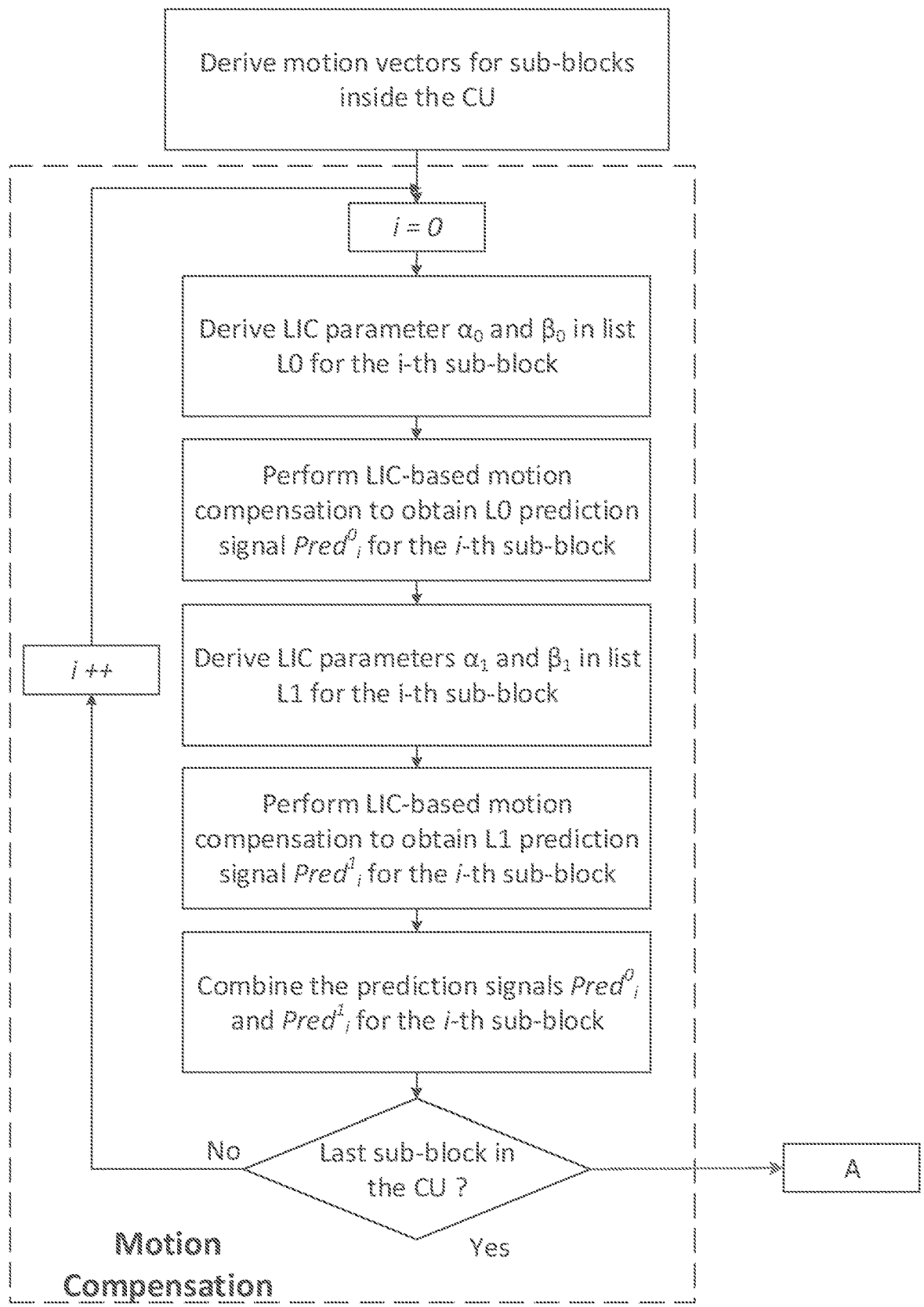
FIGS. 8A-8B are diagrams illustrating example motion compensation operations associated with generating a prediction signal for a coding block when LIC is applied.
Figure 8B:
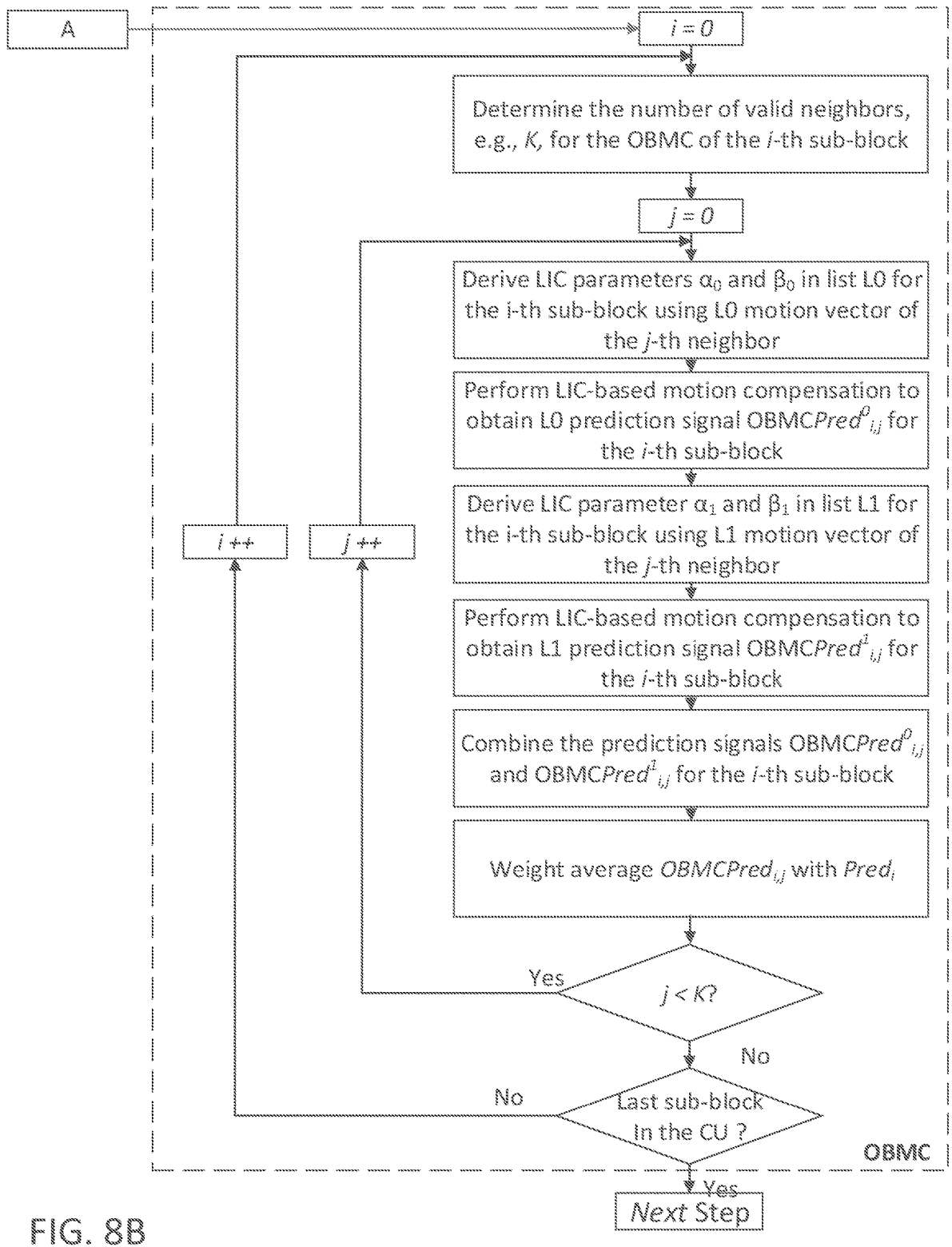

As described herein, LIC may enhance regular motion-compensated prediction, e.g., by addressing illumination changes between different pictures at the motion compensation stage. FIGS. 8A-8B is a diagram illustrating example motion compensation operations associated with generating a prediction signal for a coding block when LIC is applied. In the example of FIGS. 8A-8B, a coding block may be bi-predicted and may include multiple sub-blocks (e.g., the block may be coded in a sub-block mode). The dotted text blocks in FIGS. 8A-8B may describe LIC-related operations.

In examples, when a current block or sub-block is bi-predicted, LIC may be applied to prediction signals in reference lists L0 and L1 separately, e.g., as shown in equation (4). LIC parameter estimation and/or LIC-based sample adjustment (e.g., as shown in equation (1)) may be performed twice to generate a prediction signal for a current block or sub-block. Such approaches (e.g., as shown in equations (2) and (3)) may derive LIC seating factors and offsets (e.g., using a template-based approach). LIC parameters (e.g., LIC scaling factors and/or offsets) may be combined with a sub-block coding mode (e.g., such as ATMVP, STMVP, FRUC, and/or the like). With a sub-block coding mode, a block may be divided into one or more (e.g., multiple) sub-blocks and the sub-blocks may be associated with corresponding motion vectors (e.g., unique motion vectors). When LIC is applied to the block, LIC parameters may be derived for the prediction directions (e.g., L0 and L1) of the sub-blocks.

In examples, when LIC is applied to a coding block (e.g., as shown in FIGS. 8A-8B), LIC may be enabled at a motion compensation stage (e.g., regular motion compensation stage) and/or an OBMC stage. LIC may be invoked one or more (e.g., multiple) occasions. For example, LIC may be invocated at the motion compensation stage and/or the OBMC stage. The invoked LIC may generate a prediction signal for a current block. A sub-block inside a coding block may be assigned a motion vector (e.g., its own motion vector). LIC operations (e.g., LIC parameter estimation and/or LIC-based sample adjustment) may be performed for the motion vector FIG. 7 may illustrate an example associated with the approach described herein. If sub-blocks A, a, b, c, and d in FIG. 7 are bi-predicted, eight LIC operations may be performed at the OBMC stage to generate a prediction signal for the sub-block A. Two of the eight LIC operations may be related to LIC-based motion compensation using motion vectors associated with a neighboring sub-block. If K represents the number of sub-blocks inside a current block, a total of 10*K LIC invocations (e.g., 2*K LIC invocations associated with regular motion compensation and 2*4*K LIC invocations associated with OBMC) may be performed to generate prediction signals for the current block.

LIC may be employed to compensate illumination changes (e.g., at the motion compensation stage) between one or more temporal reference pictures and a current picture. LIC may be applied based on a linear model. As described herein, scaling factors and/or weights may be estimated (e.g., estimated separately) for the prediction directions when bi-prediction is applied.

One or more of the following may be applied when performing LIC operations. LIC parameters may be estimated (e.g., estimated once) for a bi-predicted video coding unit (e.g., a block or sub-block). For example, LIC parameters may be estimated by considering the bi-prediction reference template samples (e.g., averaging reference template samples) of template samples associated with a current block or sub-block. By considering the bi-prediction reference template samples of the template samples for the current block or sub-block, fewer LIC operations (e.g., one LIC parameter estimation and one LIC-based sample adjustment) may be performed to generate a prediction signal for a current block/sub-block.

Optimization approaches may be used to derive and/or adjust LIC parameters. The scaling factors and offsets associated with lists L0 and L1 may be jointly optimized (e.g., jointly adjusted).

Some examples are provided herein in the context of a sub-block mode. For example, a coding block may be split into one or more sub-blocks, and a sub-blocks may be assigned with a motion vector. A skilled person in the art will realize that the approaches described herein may be applied to video blocks coded in a different coding mode (e.g., the coding block that may not be split and/or may not have a single motion).

A current block and/or a current sub-block may be bi-predicted. In examples, if a current block or a sub-block is bi-predicted, LIC parameters may be derived (e.g., separately derived) and applied for reference lists L0 and L1. LIC prediction signals associated with the reference lists may be averaged to generate a prediction signal for a current block or sub-block. In some examples described herein, LMSE-based LIC derivation may be performed one or more times.

Bi-prediction reference template samples (e.g., bi-predicted reference template samples) may be generated for template samples associated with a current block or sub-block. Reference template samples may be identified, for example, based on one or more motion vectors associated with the current block or sub-block. For example, the reference template samples may neighbor temporal reference CUs of the current CU and may correspond to template samples for the current CU. The reference template samples may be jointly considered (e.g., averaged) in LIC parameter derivation. For example, the identified reference template samples for template samples may be averaged to generate bi-predicted reference template samples. In examples, LMSE-based approaches (e.g., an LMSE estimation or calculation) may be applied to derive LIC parameters that may be used to adjust a prediction signal for the current block or sub-block. For example, the LMSE-based approaches may be performed to determine the LIC parameters such that the differences between the bi-predicted reference template reference samples and the template samples for the current CU may be minimized.

In examples, LIC parameters may be calculated based on using a linear model approach. For example, a linear model approach may use a minimum value and/or a maximum value associated with the bi-predicted reference template samples and the template samples. The minimum and/or maximum values of the template samples and the bi-predicted reference templates samples may be used to determine the LIC parameters.

Figure 9:
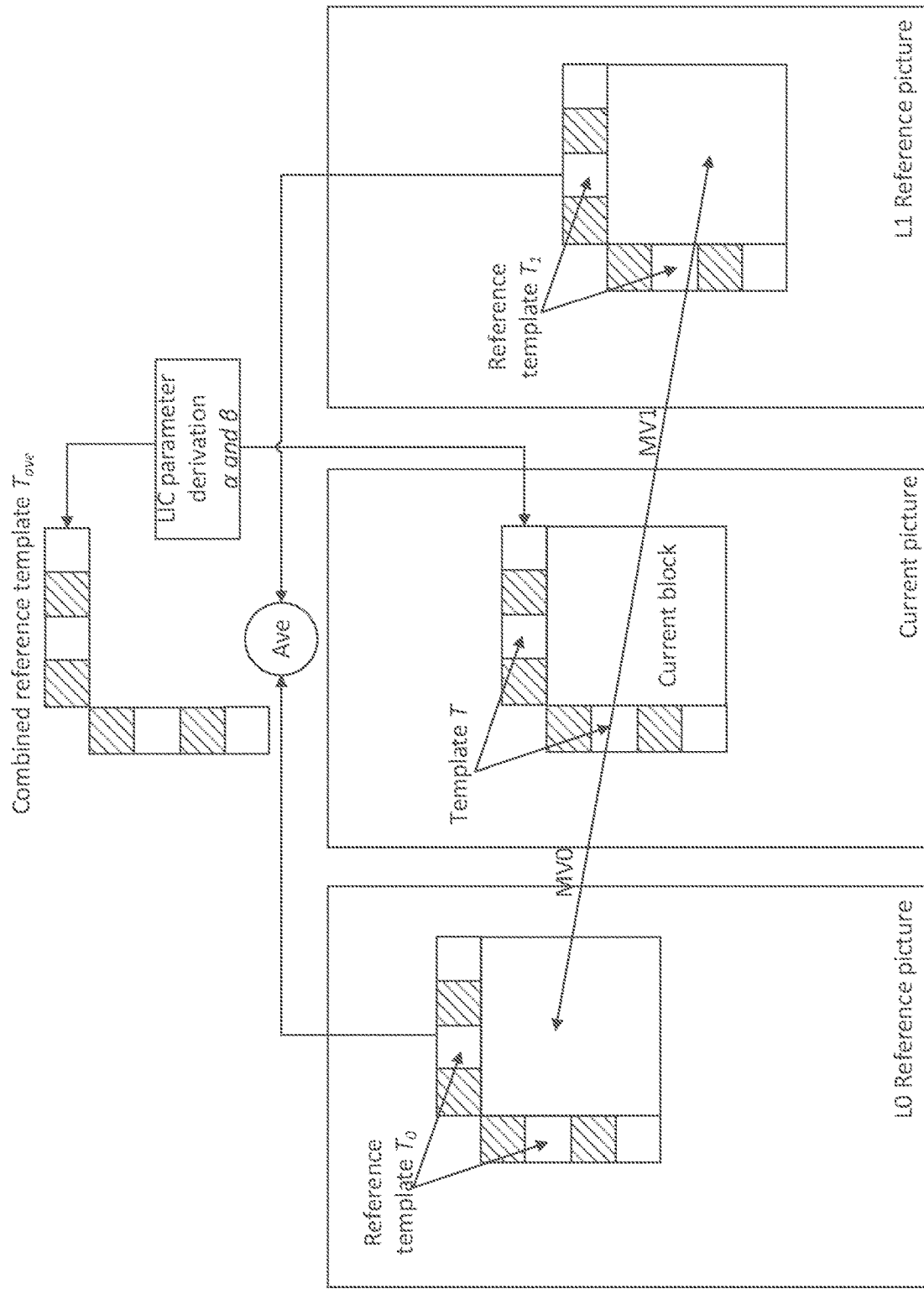
FIG. 9 is a diagram illustrating example bi-directional LIC operations.

FIG. 9 is a diagram illustrating example LIC operations as described herein (e.g., for bi-directional prediction or bi-predicted CU). $T(x, y)$ may represent a template sample for a current block or sub block at coordinates $(x, y)$. $T_0(x+v_x^0, y+v_y^0)$ and $T_1(x+v_x^1, y+v_y^1)$ may respectively represent reference template samples neighboring temporal reference CUs (e.g., L0 and L1 lists, respectively) that correspond to the template samples for the current CU. The reference template samples may be derived based on bi-directional motion vectors $(v_x^0, v_y^0)$ and $(v_x^1, v_y^1)$ of the current block or sub-block. A bi-predicted reference template sample of the template samples may be generated. For example, a bi-predicted reference template sample may be generated based on equation (8) by averaging the identified reference template samples (e.g., that are associated with neighboring temporal reference CUs such as L0 and L1 shown in FIG. 9) of the template samples for the current CU.

$$T_{ave}(x,y) = \frac{1}{2} \cdot (T_0(x+v_x^0, y+v_y^0) + T_1(x+v_x^1, y+v_y^1)) \quad (8)$$

LMSE-based approaches may be used to derive LIC parameters, such as a scaling factor and/or an offset associated with LIC. The scaling factors and/or offset associated with LIC may be derived using the LMSE-based approaches, for example, by minimizing the difference between template samples (e.g., for the current CU) and corresponding bi-predicted reference template samples (e.g., bi-directional reference samples), as illustrated by equations (9) and (10).

$$\alpha = \frac{N \cdot \sum_{i=1}^{N}(T(x_i, y_i) \cdot T_{ave}(x_i, y_i)) - \sum_{i=1}^{N}(T(x_i, y_i)) \cdot \sum_{i=1}^{N}(T_{ave}(x_i, y_i))}{N \cdot \sum_{i=1}^{N}(T(x_i, y_i) \cdot T_{ave}(x_i, y_i)) - \left(\sum_{i=1}^{N} T_{ave}(x_i, y_i)\right)^2} \quad (9)$$

$$\beta = \frac{\sum_{i=1}^{N}(T(x_i, y_i)) - \alpha \cdot \sum_{i=1}^{N}(T_{ave}(x_i, y_i))}{N} \quad (10)$$

Parameter N may represent the number of template samples associated with a current block/sub-block.

A skilled person in the art will realize that the LMSE approaches described herein may be an example of deriving LIC parameters. As such, one or more approaches, such as linear model approaches described herein, may be used to derive LIC parameters using bi-predicted reference template samples.

The derived LIC parameters may be applied to the bi-predicted reference template samples signal of the current block or sub-block based on a linear model, e.g., as illustrated by equation (11).

$$P(x, y) = \alpha \cdot \frac{(P_r^0(x+v_x^0, y+v_y^0) + P_r^1(x+v_x^1, y+v_y^1))}{2} + \beta \quad (11)$$

$P(x, y)$ may be the prediction signal of the current block or sub-block. $P_r^0(x+v_x^0, y+v_y^0)$ and $P_r^1(x+v_x^1, y+v_y^1)$ may be the two reference blocks and/or sub-blocks of the current block or sub-block associated with L0 and L1, respectively.

Figure 10A:
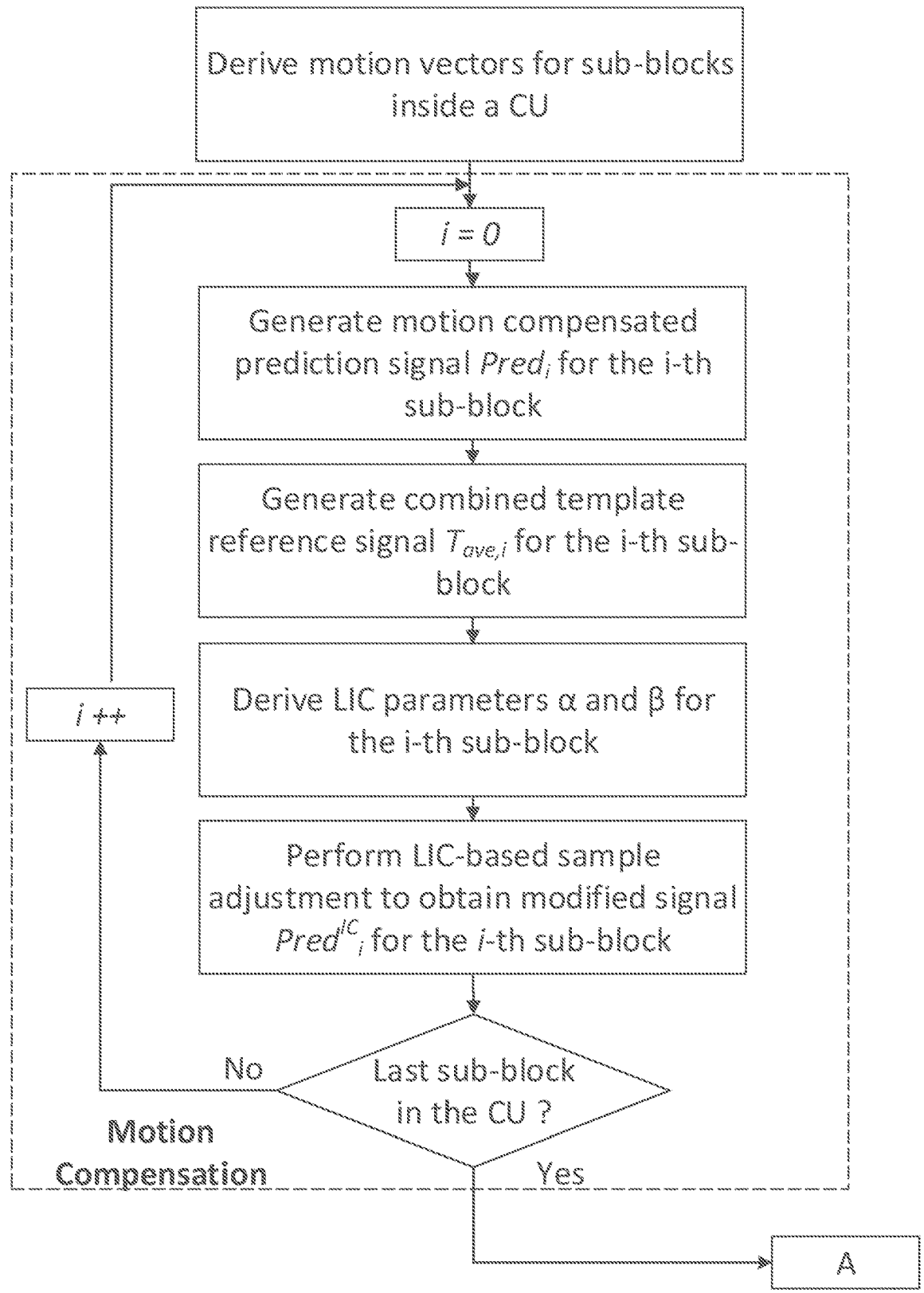
FIGS. 10A-10B are diagrams illustrating example motion compensation operations when bi-directional LIC is applied.
Figure 10B:
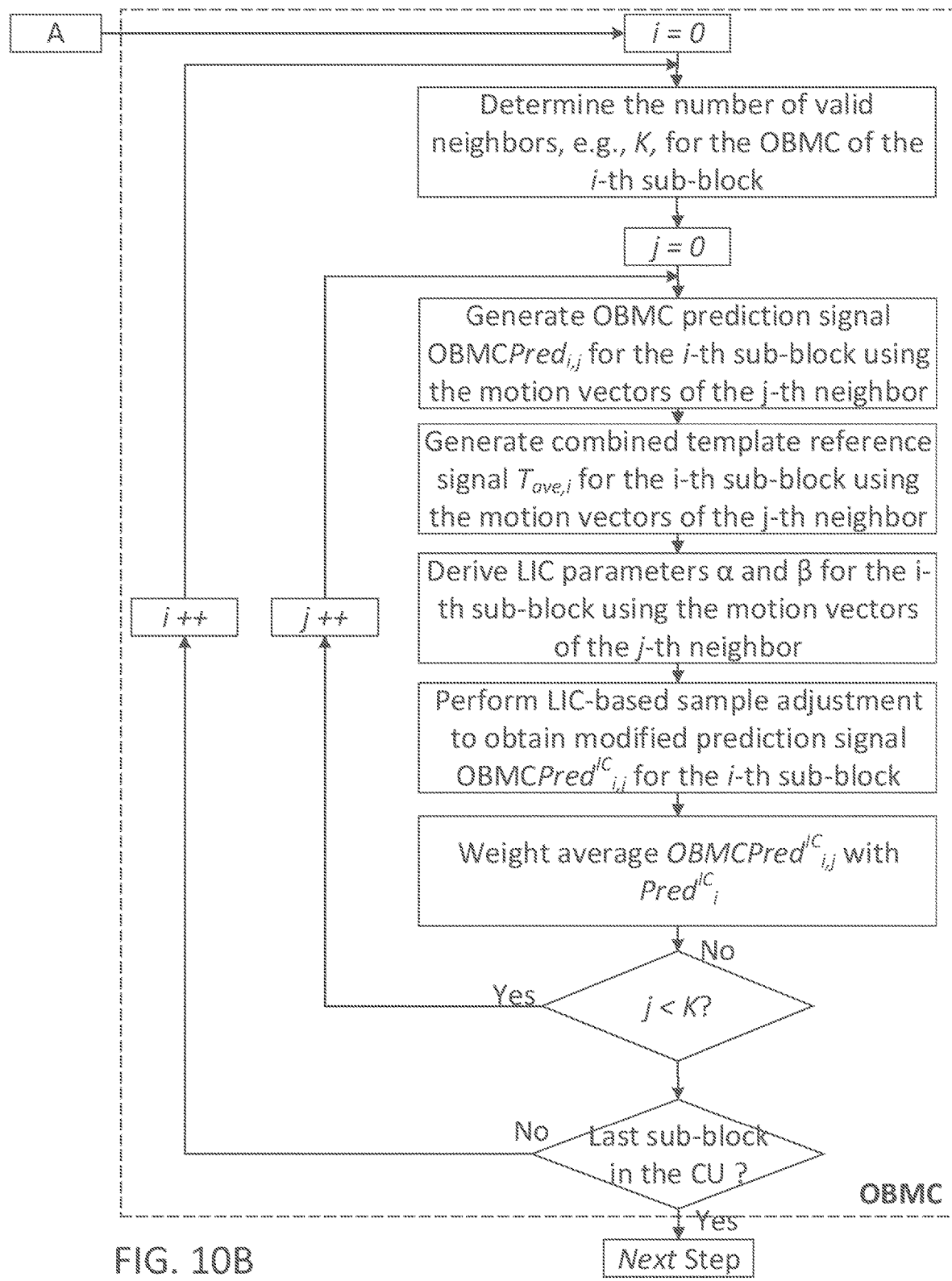

As described herein, one LIC parameter estimation and one LIC-based sample adjustment may be performed to derive a prediction signal for a bi-predicted block or sub-block. FIGS. 10A-10B are diagrams illustrating example motion compensation operations after the bi-directional LIC described herein is applied.

Parameter K may represent the total number of sub-blocks within a current coding block. As illustrated in FIGS. 8A-8B, estimating LIC parameter for one or mote prediction directions separately may result in approximately 10*K LIC operations to generate a prediction signal for the current block. Using the approaches illustrated in FIGS. 10A-10B, approximately 5*K LIC operations may be performed to generate the prediction signals for the current block. The 5*K LIC operations may include, for example, approximately K LIC operations associated with regular motion compensation and approximately 4*K LIC operations associated with OBMC.

As illustrated in FIGS. 8A-8B, LIC may be enabled at OBMC stage. For example, LIC may be enabled when LIC is applied to a coding block. Enabling LIC at the OBMC stage may result in one or more (e.g., multiple) LIC invocations and may generate a prediction signal for a current block. When LIC is applied in a sub-block mode (e.g., ATMVP, STMVP, FRUC, and/or the like) that allows a block to be split into multiple sub-blocks and a sub-block having a motion vector, the number of LIC invocations may increase further, e.g., since LIC parameter derivation may be frequently invoked during OBMC-based motion compensation using motion vectors associated with a spatial neighbor of a current sub-block.

Reference template samples may be combined to derive LIC parameters at the OBMC stage. LIC operations at the OBMC stage may be simplified. The reference template samples associated with a template sample for a current block or sub-block, may be combined (e.g., by averaging the reference template samples). A pair of scaling factor and offset may be estimated. For example, a pair of scaling factor and offset may be estimated by minimizing the differences between the template samples and the combined reference template samples. The pair of scaling factor and offset may be used for OBMC-based motion compensation of the current block or sub-block. Using the example shown in FIG. 7, a combined prediction signal for the template samples of the current sub-block A may be generated by averaging corresponding reference template samples using the motion vectors of the neighboring sub-blocks, e.g., four neighboring sub-blocks such as a, b, c, and d. Averaging reference template samples using fee motion vectors of fee neighboring sub-blocks may be illustrated by equation (12).

$$T_{ave}(x, y) = \frac{T_a(x+v_x^a, y+v_y^a) + T_b(x+v_x^b, y+v_y^b) + T_c(x+v_x^c, y+v_y^c) + T_d(x+v_x^d, y+v_y^d)}{4} \quad (12)$$

Samples $T_a(x+v_x^a, y+v_y^a)$, $T_b(x+v_x^b, y+v_y^b)$, $T_c(x+v_x^c, y+v_y^c)$, and $T_d(x+v_x^d, v_y^d)$ may be reference template samples generated using motion vectors associated with the neighboring sub-blocks a, b, c, and d, respectively. A set of LIC parameters may be estimated by applying LMSE-based optimization to minimize the differences between T(x, y) and $T_{ave}$(x, y), e.g., based on equations (9) and (10). The derived values of the LIC parameters, such as the scaling factor α and offset β, may be used for OBMC-based motion compensation from the neighboring sub-blocks a, b, c, and d (e.g., for one or more OBMC-based motion compensations from the neighboring sub-blocks a, b, c, and d).

Figure 11A:
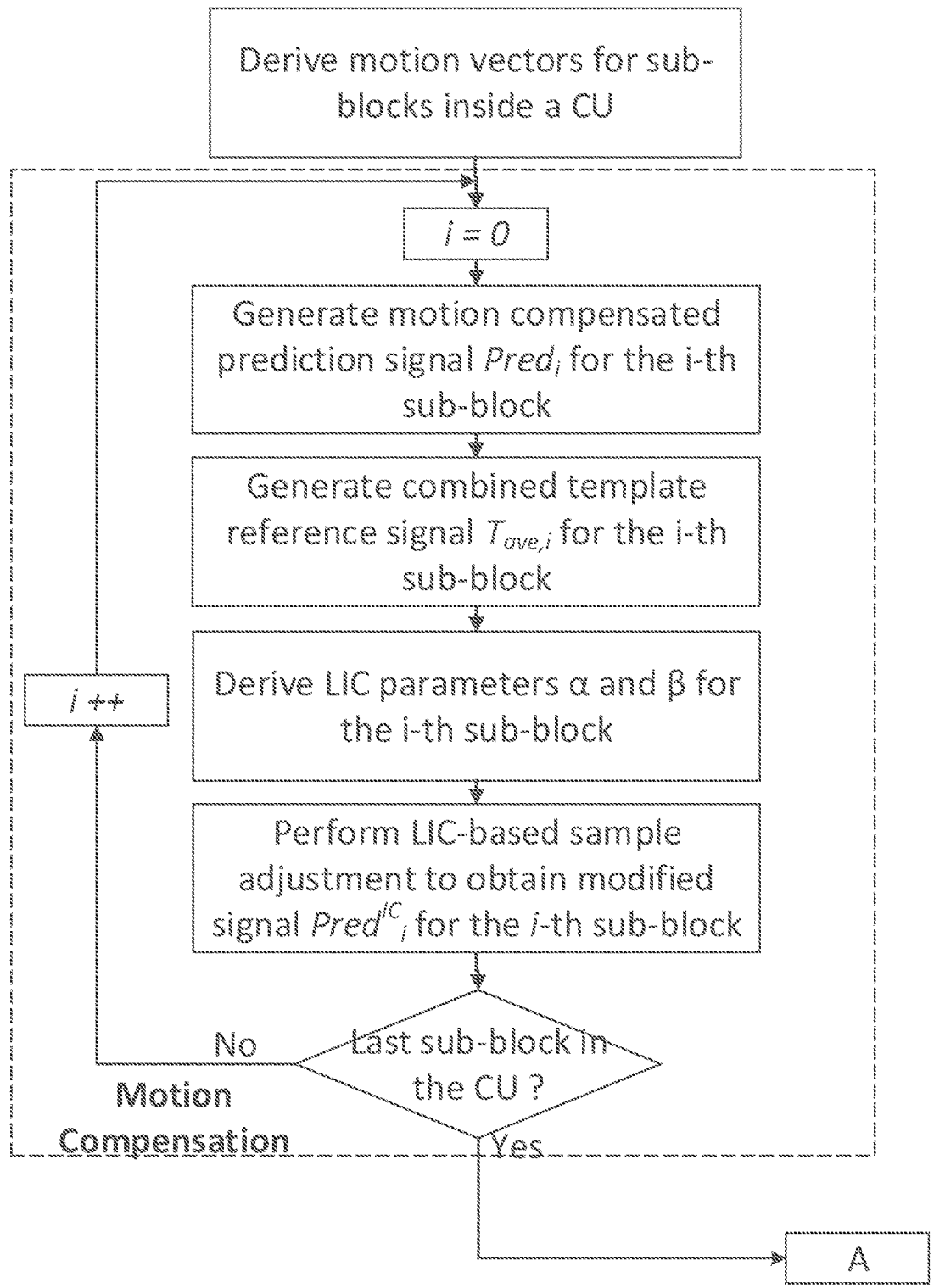
FIGS. 11A-11B are diagrams illustrating example motion compensation operations when LIC parameters are derived once at an OBMC stage.
Figure 11B:
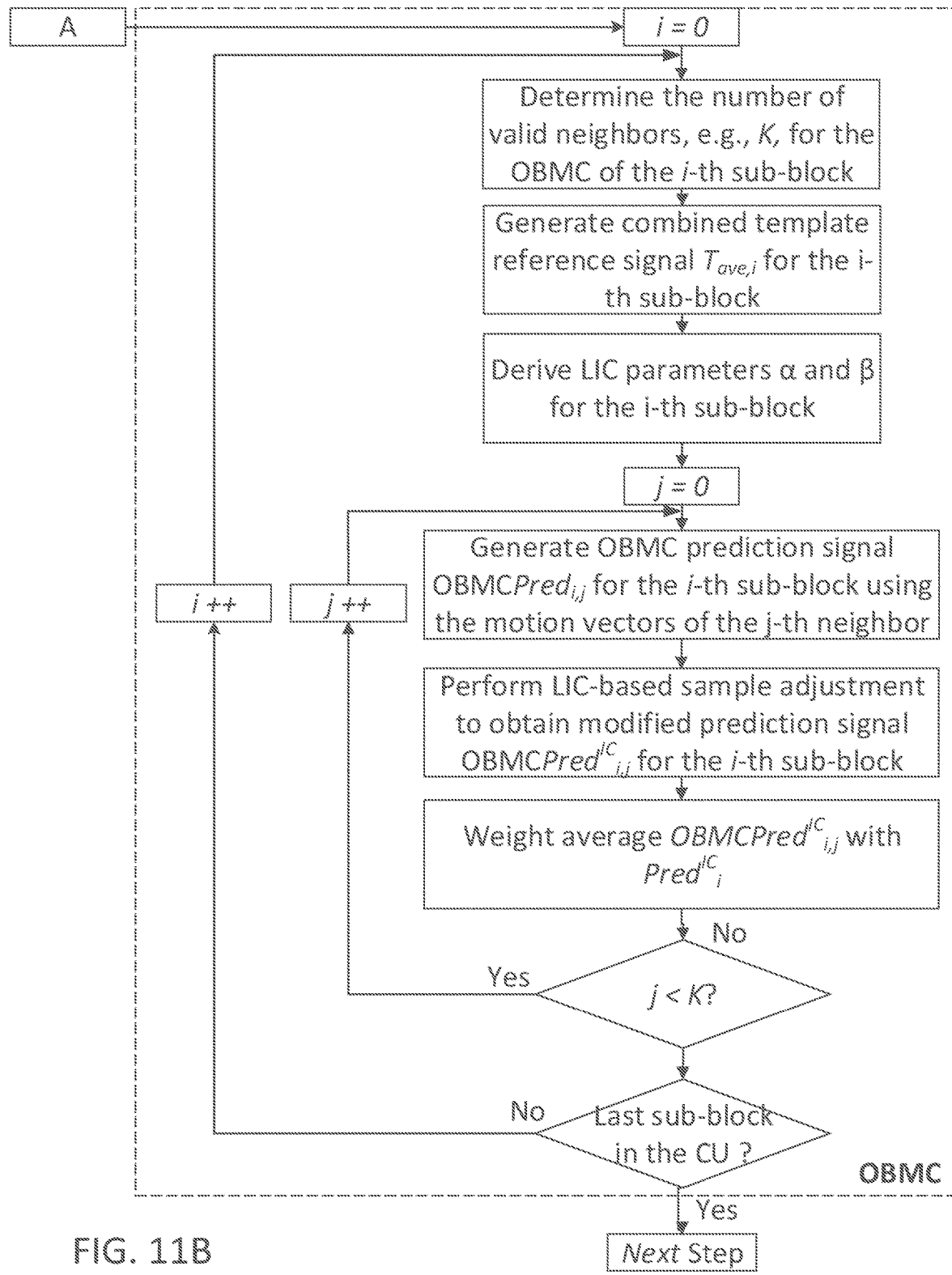

FIGS. 11A-11B are diagrams illustrating example motion compensation operations when LIC parameters are derived (e.g., derived once) at an OBMC stage. Using the example approaches described herein, the total number of LIC derivations may be reduced to 2*K (e.g., with K derivations for regular motion compensation and K derivations for OBMC).

LIC parameter derivation and sample adjustment may be performed, e.g., for regular motion compensation and/or OBMC. LIC parameters derived during regular motion compensation may be reused for OBMC. For example, LIC parameters may be derived and stored for one or more sub-blocks inside a current block at the regular motion compensation stage. At the OBMC stage, fee stored LIC parameters may be reused (e.g., fetched) for OBMC-based motion compensation of a current sub-block.

Figure 12A:
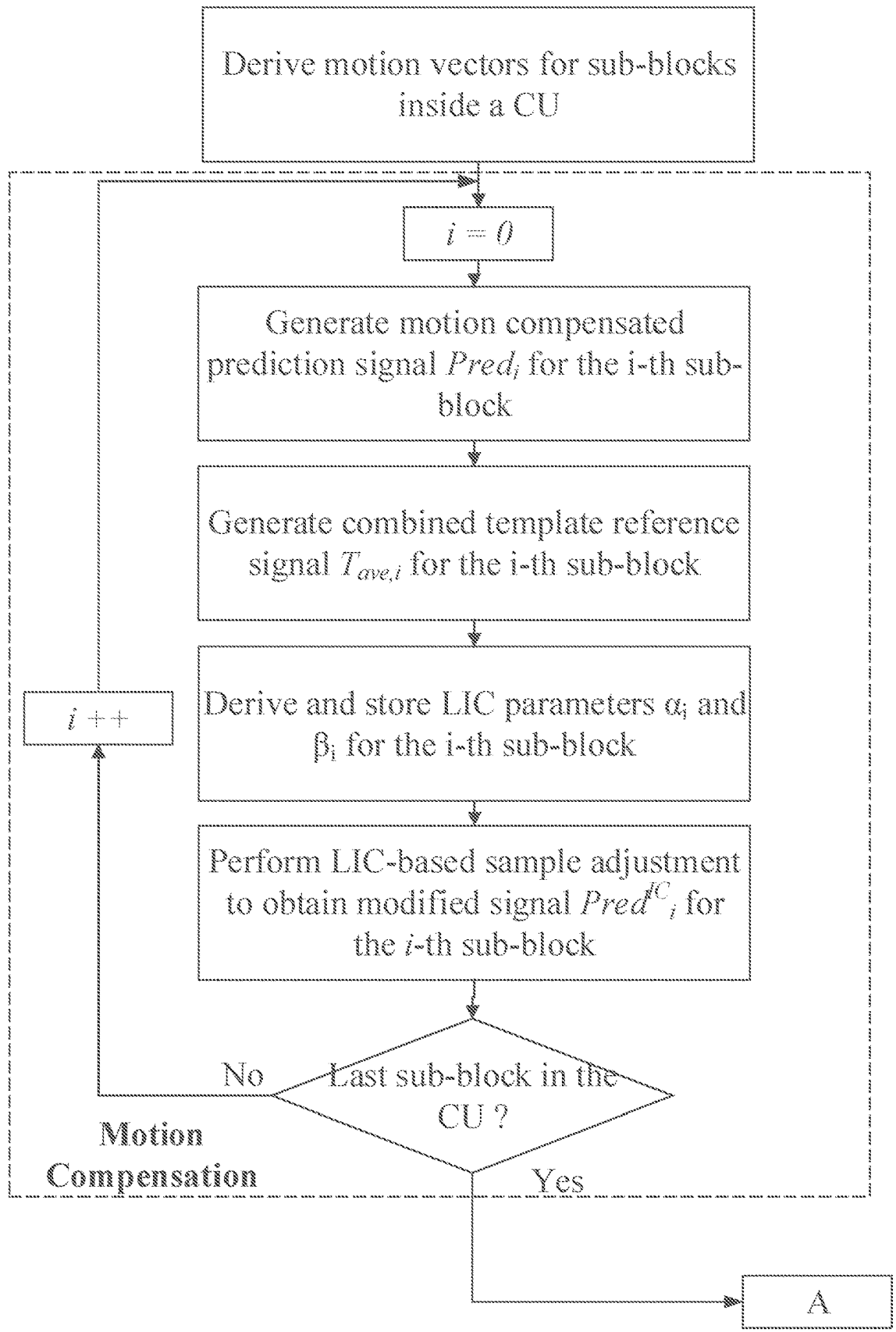
FIGS. 12A-12B are diagrams illustrating example motion compensation operations during which LIC parameters derived from regular motion compensation may be reused for OBMC.
Figure 12B:
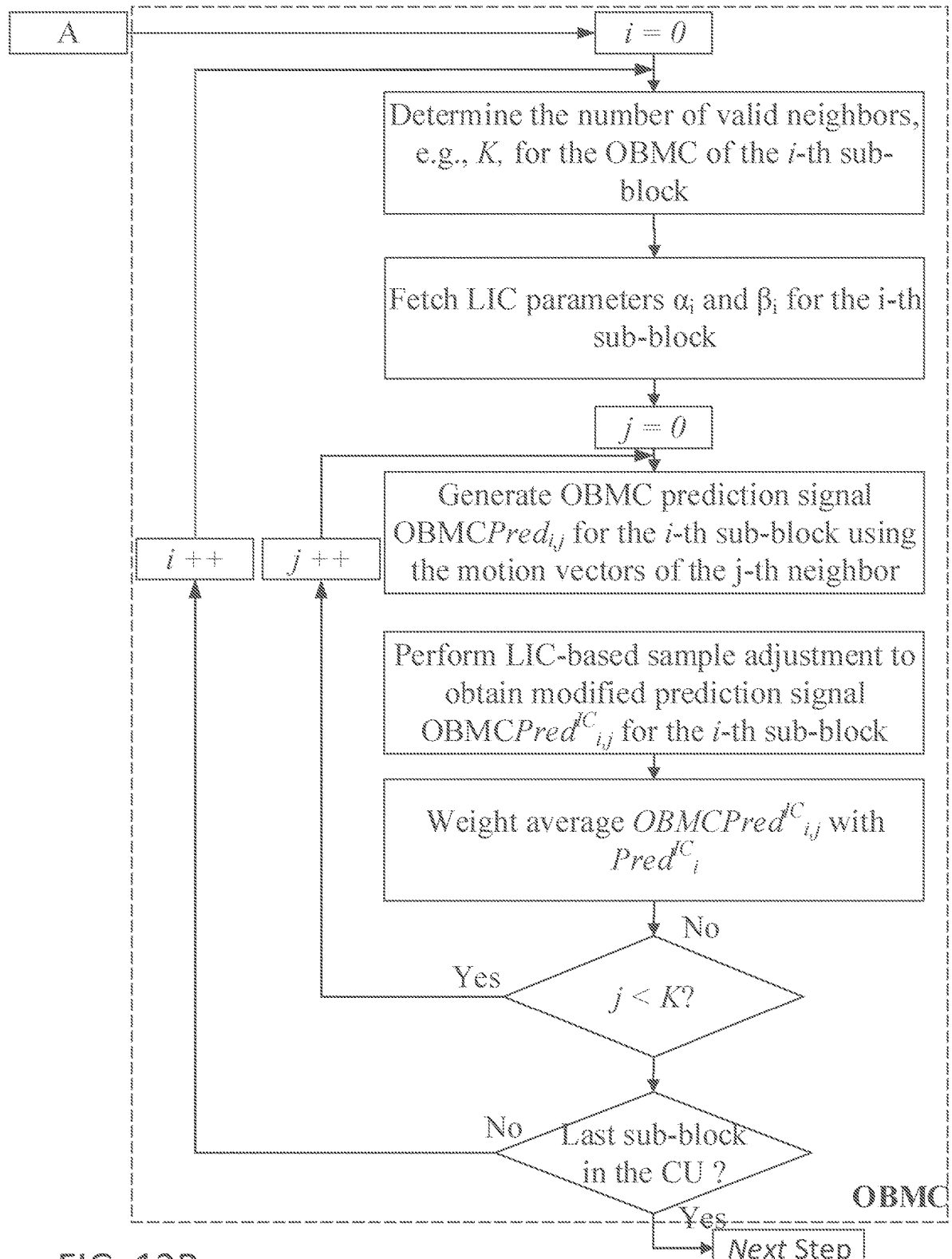

FIGS. 12A-12B are diagrams illustrating example motion compensation operations during which LIC parameters derived from regular mot-on compensation may be reused for OBMC. The total number of LIC derivations may be reduced to approximately K (e.g., from 2*K with K derivations for regular motion compensation and K derivations for OBMC) if the LIC parameters are reused.

Using the example approaches shown in FIGS. 12A-12B, the number of LIC parameter derivations may be reduced. The total number of LIC-based sample adjustments (e.g., according to equation (1)) that may be performed at the regular motion compensation stage and/or the OBMC stage may be similar to (e.g., the same as), for example that in JEM. For example, approximately 5*K LIC-based sample adjustments (e.g., K LIC-based sample adjustment may occur at the regular motion compensation stage and 4*K LIC-based sample adjustments may occur at the OBMC stage) may be performed before a prediction signal of a current block is generated. When LIC parameters derived from the regular motion compensation stage are reused at the OBMC stage, on-chip memory (e.g., additional on-chip memory) may be used to store the LIC parameters (e.g., scaling factors α and offsets β). For example, a maximum coding tree unit (CTU) size may be 128*128, and a sub-block size may be 4*4. Scaling factor α and offset β may respectively represent with a precisions of 5-bit and the bit-depth of the input video. For 10-bit input videos, the size of on-chip memory for caching the LIC parameters may be approximately equal to 3 KByte (e.g., (128/4)*(128/4)*(1 Byte+2 Byte)=32*32*3 Byte).

As discussed herein, LIC-based sample adjustment and the calculation of the weighted-average of multiple prediction samples in OBMC may involve linear operations. The impact of rounding errors (e.g., which may be caused by converting floating-point operations to fixed-point operations) may be minor. Coding performances before and after changing the order of LIC-based sample adjustment and OBMC-based sample averaging may be similar to each other.

Figure 13A:
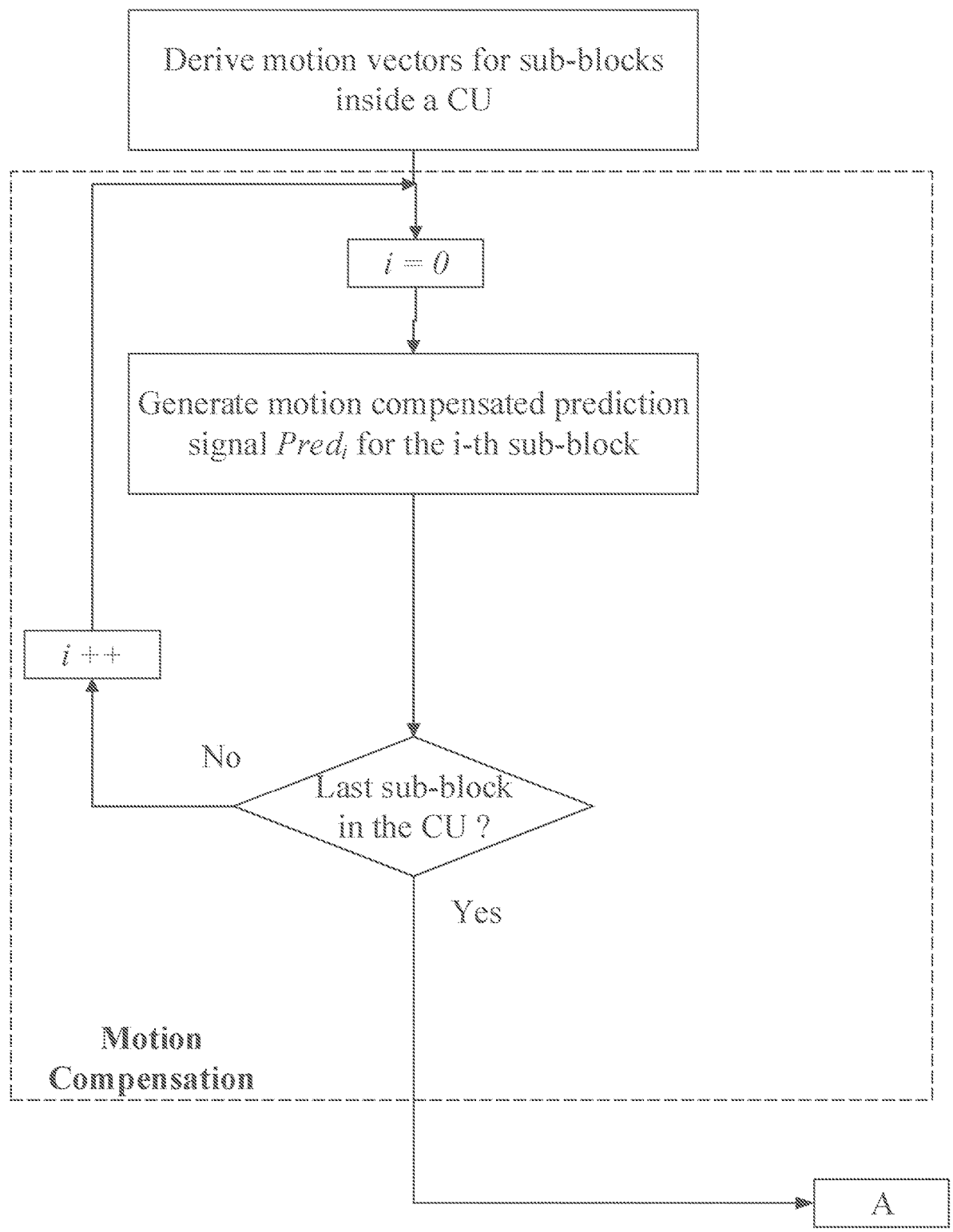
FIGS. 13A-13B are diagrams illustrating example motion compensation operations in which LIC is performed after prediction signals for OBMC have been generated.
Figure 13B:
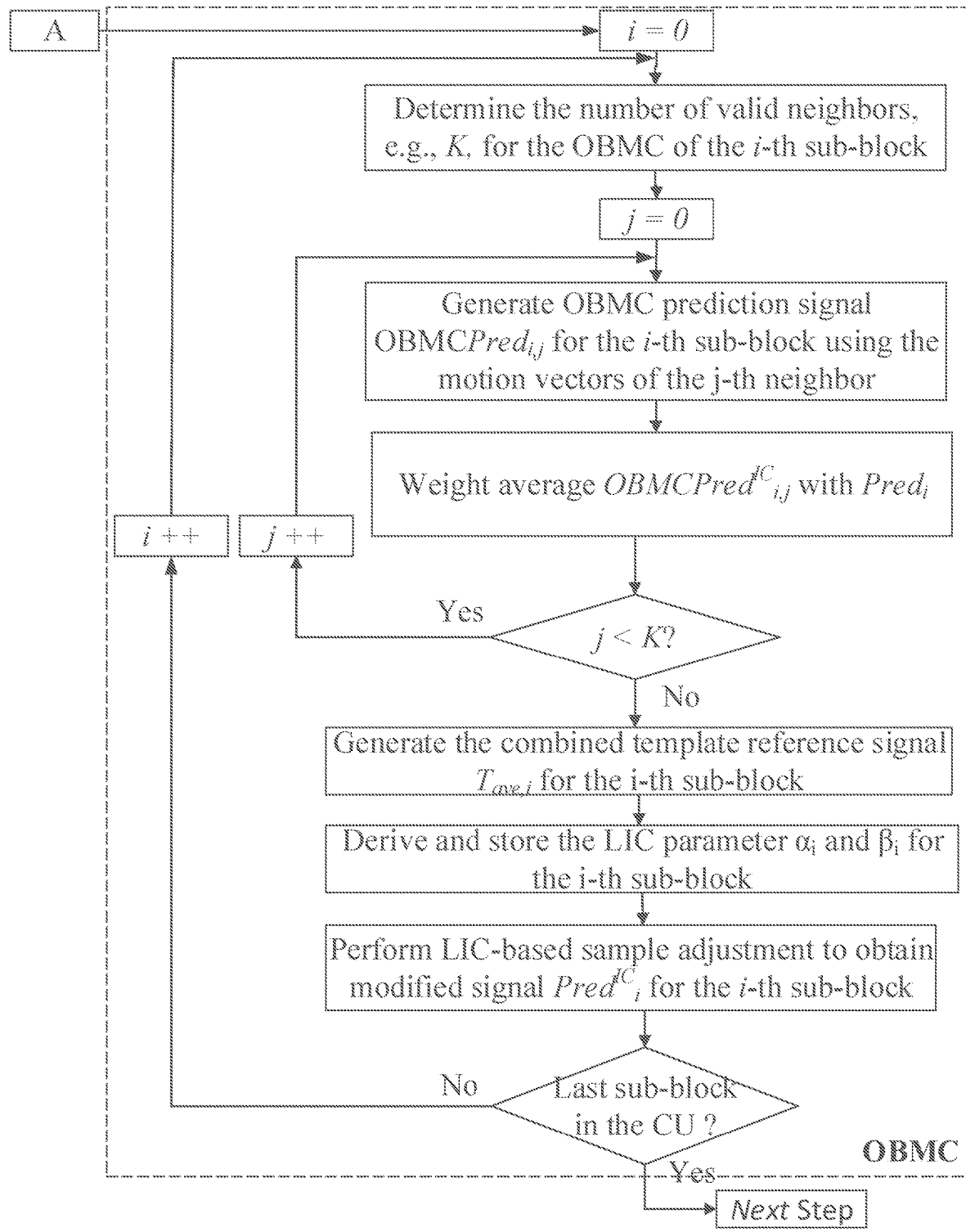

One or more LIC operations may be performed after OBMC-based sample averaging has been conducted. FIGS. 13A-13B depict example motion compensation operations using the approaches described herein. As shown, regular motion compensation may be applied to generate a motion-compensated prediction signal for sub-blocks inside a CU. OBMC may be applied to the sub-blocks (e.g., sub-blocks inside the CU) by combining the prediction signal of the sub-block with one or more prediction signals generated using the motion vectors of one or more spatial neighbors.

If LIC is enabled tor a CU, LIC parameters may be derived (e.g., calculated) for one or more sub-block of the CU using the bi-directional LIC parameter derivation approaches described herein. The prediction samples of the sub-block may be adjusted using the derived LIC parameters. For example, as shown in FIGS. 13A-13B, the fetal number of LIC-based operations tor LIC-based parameter derivation and/or LIC-based sample adjustment may be reduced to K. Storage of LIC parameters may be omitted (e.g., since LIC is performed after OBMC) such that memory space (e.g., memory buffers) that would be used to cache the LIC parameters may be saved.

As shown in FIGS. 13A-13B, LIC parameter derivation and/or LIC-based sample adjustment may be performed after the OBMC of a sub-block is finished. Using this approach, the storing of LIC parameters may be omitted.

LIC parameter derivation may be performed at the regular motion compensation stage. The derived LIC parameters may be used for sample adjustment. For example, the derived LIC parameters may be used for sample adjustment after the OBMC of a sub-block is finished and a OBMC prediction signal (e.g., a combined OBMC prediction signal) has been generated. LIC-based sample adjustment may be disabled at the regular motion compensation stage. If LIC-based sample adjustment is disabled at the regular motion compensation stage, the LIC parameters derived at the regular motion compensation stage may not be used to adjust prediction samples generated from the regular motion compensation stage.

Figure 14A:
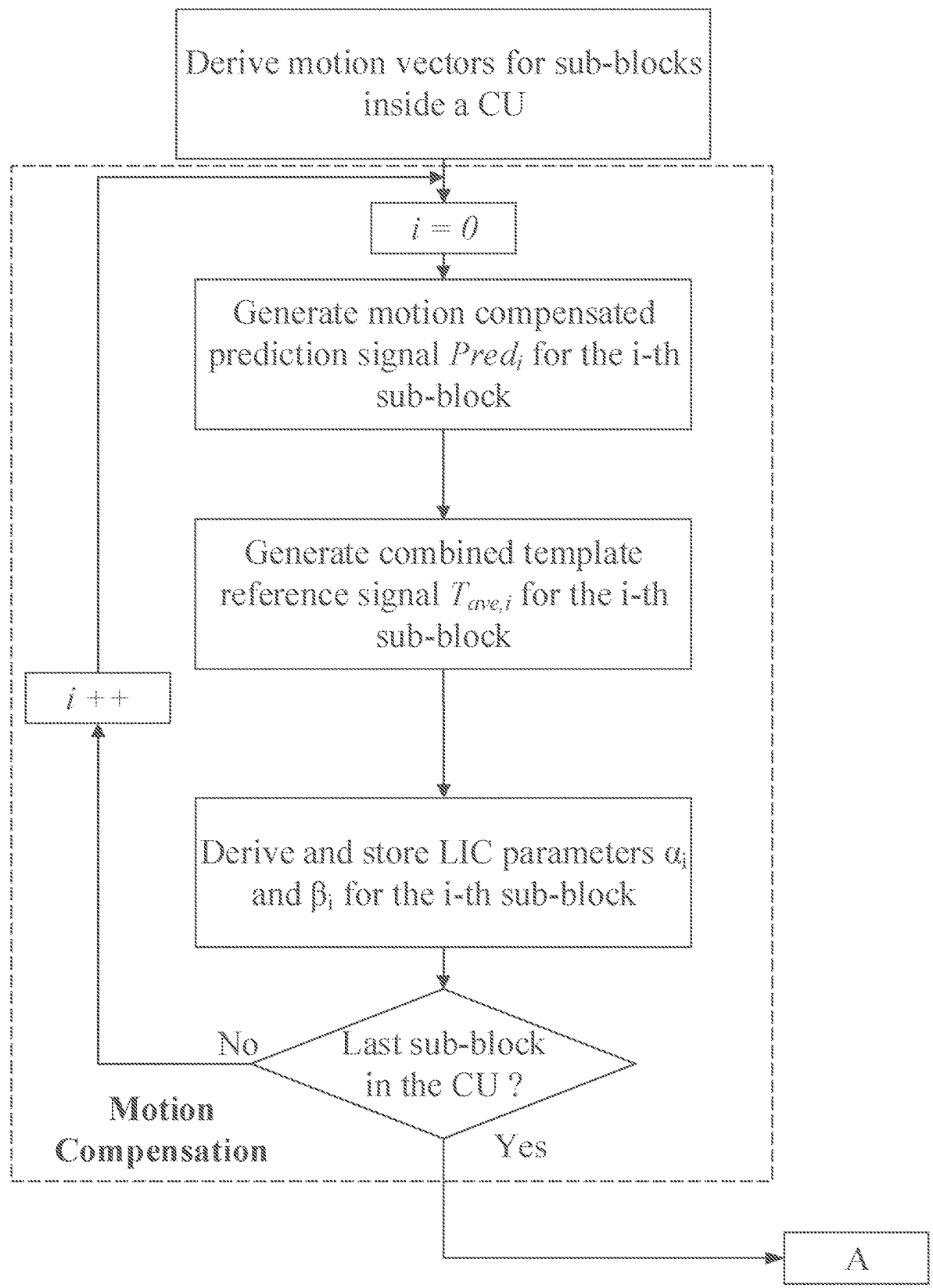
FIGS. 14A-14B are diagrams illustrating example motion compensation operations in which LIC parameters are derived at a regular motion compensation stage and LIC-based sample adjustment is performed after OBMC.
Figure 14B:
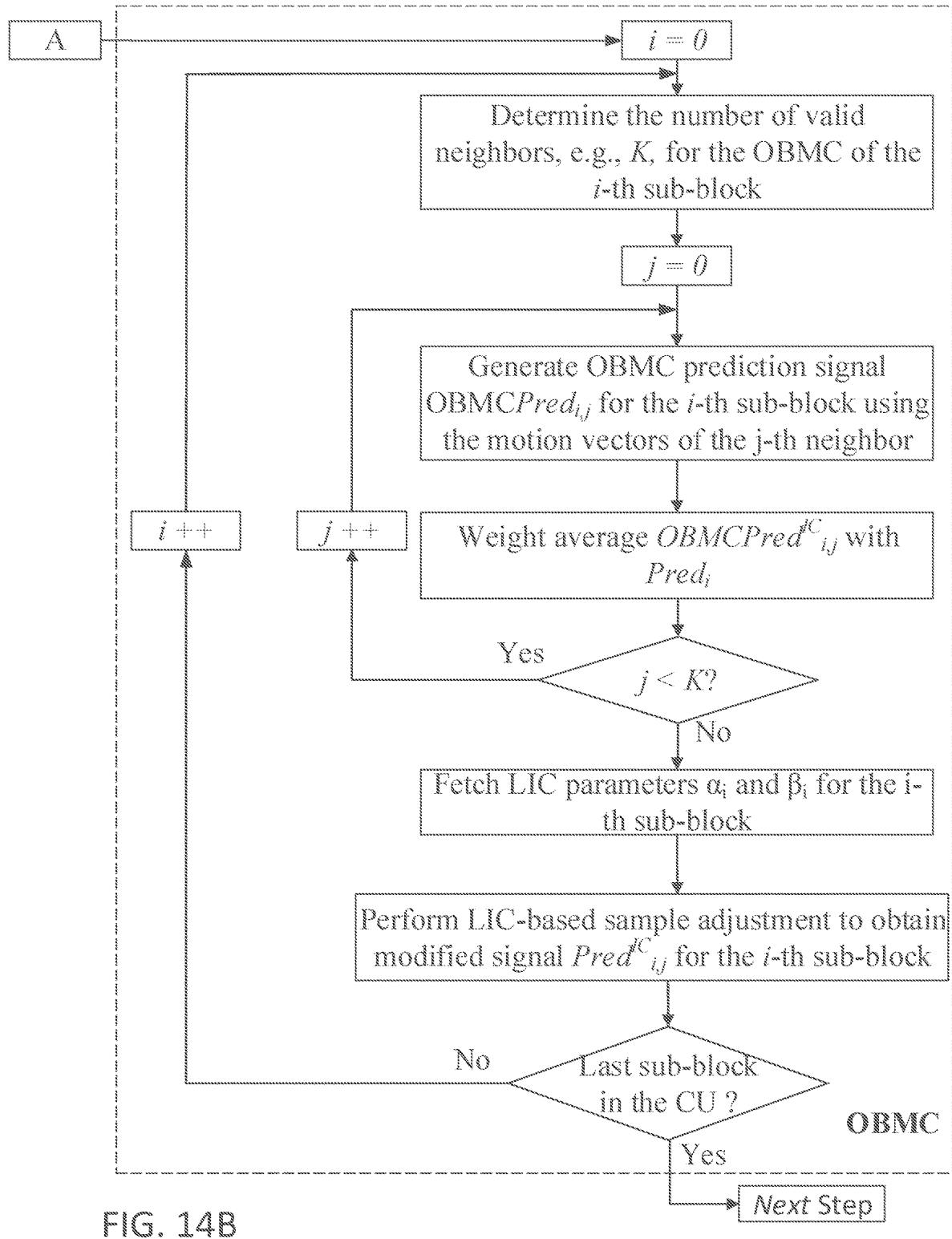

FIGS. 14A-14B illustrates example motion compensation operations using fee approaches described herein (e.g., motion compensation by deriving the LIC parameters at the regular motion compensation stage and performing the LIC-based sample adjustment after fee OBMC). LIC parameter derivation and OBMC may be performed in parallel (e.g., the derivation of LIC parameters and the OBMC for a sub-block may be performed simultaneously and/or in parallel). LIC-adjusted prediction samples may be obtained with reduced latency (e.g., minimum latency).

It should be noted that although bi-directional LIC parameter derivation approaches are described herein to facilitate LIC simplification at the OBMC stage, such simplification may be realized when the bi-directional LIC parameter derivation approaches are disabled. The LIC simplification process described herein may be implemented in combination with other LIC schemes. For example, the LIC simplification process as described herein may be combined with a LIC design. The LIC parameters may be derived (e.g., derived separately) and applied for prediction lists L0 and L1, e.g., as shown in FIGS. 13A-13B and FIGS. 14A-14B. LIC-adjusted prediction signals may be averaged to generate the prediction signal of a sub-block. In these examples (e.g., the examples shown in FIGS. 14A-14B), two different sets of LIC parameters (e.g., which may include scaling factors and offsets) may be maintained at the regular motion compensation stage for prediction directions L0 and L1, respectively.

LIC operations may be disabled at the OBMC stage. For example, LIC may be skipped during OBMC-based motion compensation of one or more sub-blocks within a current block (e.g., using motion vectors associated with the neighbors of a sub-block). In examples, LIC may be disabled regardless of whether the LIC is applied to the current block during regular motion compensation.

LIC operation(s) may be disabled for the sub-block coding modes (e.g., ATMVP, STMVP, FRUC, and/or the like). For a block(s) coded by the sub-block models, the block(s) may be divided (e.g., further divided) into one or more (e.g., multiple) sub-blocks, each with motion vector (e.g., unique motion vector) to generate a fine granularity motion field. As described herein, LIC operations for the ATMVP sub-block mode may be disabled.

LIC parameters (e.g., LIC scaling factors and offsets) that are associated with reference list L0 and reference list L1 may be optimized. For example, LIC parameters may be optimized jointly (e.g., jointly adjusted). A template sample for a current CU and motion-compensated reference template samples (e.g., associated with reference lists L0 and L1) may be used as inputs to jointly optimize (e.g., jointly adjust) the scaling factors and offsets in L0 and L1. The distortion (e.g., differences) between the template sample and combined reference template samples may be minimized. For example, based on the same notations used in equations (1)-(4), an LMSE estimation may be performed as follows:

$$(\alpha^*_0, \beta^*_0, \alpha^*_1, \beta^*_1) = \arg\min \Sigma_{i=1}^{N} (2 \cdot T(x_i, y_i) - (\alpha_0 \cdot T_0 (x_i + v_x^0, y_i + v_y^0) + \beta_0) - (\alpha_1 \cdot T_1(x_i + v_x^1, y_i + v_y^1) + \beta_1))^2 \quad (13)$$

As shown, parameter N may represent a number of template samples associated with a current block or sub-block. Samples $T_0(x_i + v_x^0, y_i + v_y^0)$ and $T_1(x_i + v_x^1, y_i + v_y^1)$ may represent reference template samples of a template sample $T(x_i, y_i)$ that are associated with reference lists L0 and L1, respectively. Respective sets of LIC parameters ($\alpha^*_0, \beta^*_0, \alpha^*_1, \beta^*_1$) may be determined for the reference lists L0 and L1 such that the difference between the template samples and the combined reference template samples for L0 and L1 may be minimized. Such difference may be calculated, for example, by subtracting LIC-adjusted reference samples for both L0 and L1 from multiple (e.g., 2) template samples.

LIC techniques may be simplified for bi-prediction CUs with GBi. If GBi/BPWA is enabled, a weight index may be signaled for bi-prediction CUs. GBi may be performed on top of LIC. For example, LIC may be applied to the reference lists L0 and L1 for the two prediction blocks (e.g., each of the two prediction blocks) Generalized bi-prediction weights provided for the two illumination compensated prediction blocks for bi-prediction (e.g., each of the two illumination compensated prediction blocks for bi-prediction) may be used to combine the prediction templates.

Generalized bi-prediction may be performed on the template samples from two prediction lists and may produce GBi-based bi-prediction template reference samples. The UC parameters may be estimated. For example, the LIC parameters may be estimated using the GBi-based bi-prediction template reference samples and the template samples of the current CU. GBi and LIC may be performed (e.g., GBi followed by LIC) on bi-directional prediction signed of the current block/sub-block.

The GBi extension to equation (8) may be mathematically shown in equation (14). In LIC, the bi-directional prediction signal of the template may be generated. For example, the bi-directional prediction signal of the template may be generated by weighted averaging two reference samples of the template in L0 and L1.

$$T_w(x, y) = (1-w) \times T_0(x + v_x^0, y + v_y^0) + w \times T_1(x + v_x^1, y + v_y^1) \quad (14)$$

$T_w(x, y)$ may denote toe bi-directional prediction signal of the template. $T_0(x + v_x^0, y + v_y^0)$ and $T_1(x + v_x^1, y + v_y^1)$ may indicate the L0 and L1 reference samples of the template as indicated by the bi-directional motion vectors $(v_x^0, v_y^0)$ and $(v_x^1, v_y^1)$ of the current block/sub-block, respectively. Weights $(1-w)$ and $w$ may denote the GBi weights applied to L0 and L1 reference samples.

Linear model parameter derivation, such as LMSE-based procedure described herein, may be used to calculate the values of the scaling factor and the offset used for the LIC, e.g., by minimizing the difference between the template samples and the bi-directional reference samples given by equations (9) and (10), where $T_w(x, y)$ calculated using equation (14) may be used in place of $T_{avg}(x, y)$.

The derived LIC parameters may be applied to the bi-directional prediction signal of the current block/sub-block based on the linear model, e.g., $$P(x,y) = \alpha \cdot ((1-w) \times P_r^0(x + v_x^0, y + v_y^0) + w \times P_r^1(x + v_x^1, y + v_y^1)) + \beta \quad (15)$$

where $P(x, y)$ may indicate the prediction signal of the current block/sub-block. $P_r^0(x + v_x^0, y + v_y^0)$ and $P_r^1(x + v_x^1, y + v_y^1)$ may indicate the two references of the current block/sub-block in L0 and L1, respectively. Parameters $\alpha_0$ and $\beta_0$ may indicate the LIC slope and offset parameters. The scaling factors and the offsets in the list L0 and L1 in equation (13) may be jointly optimized.

Figure 19A:
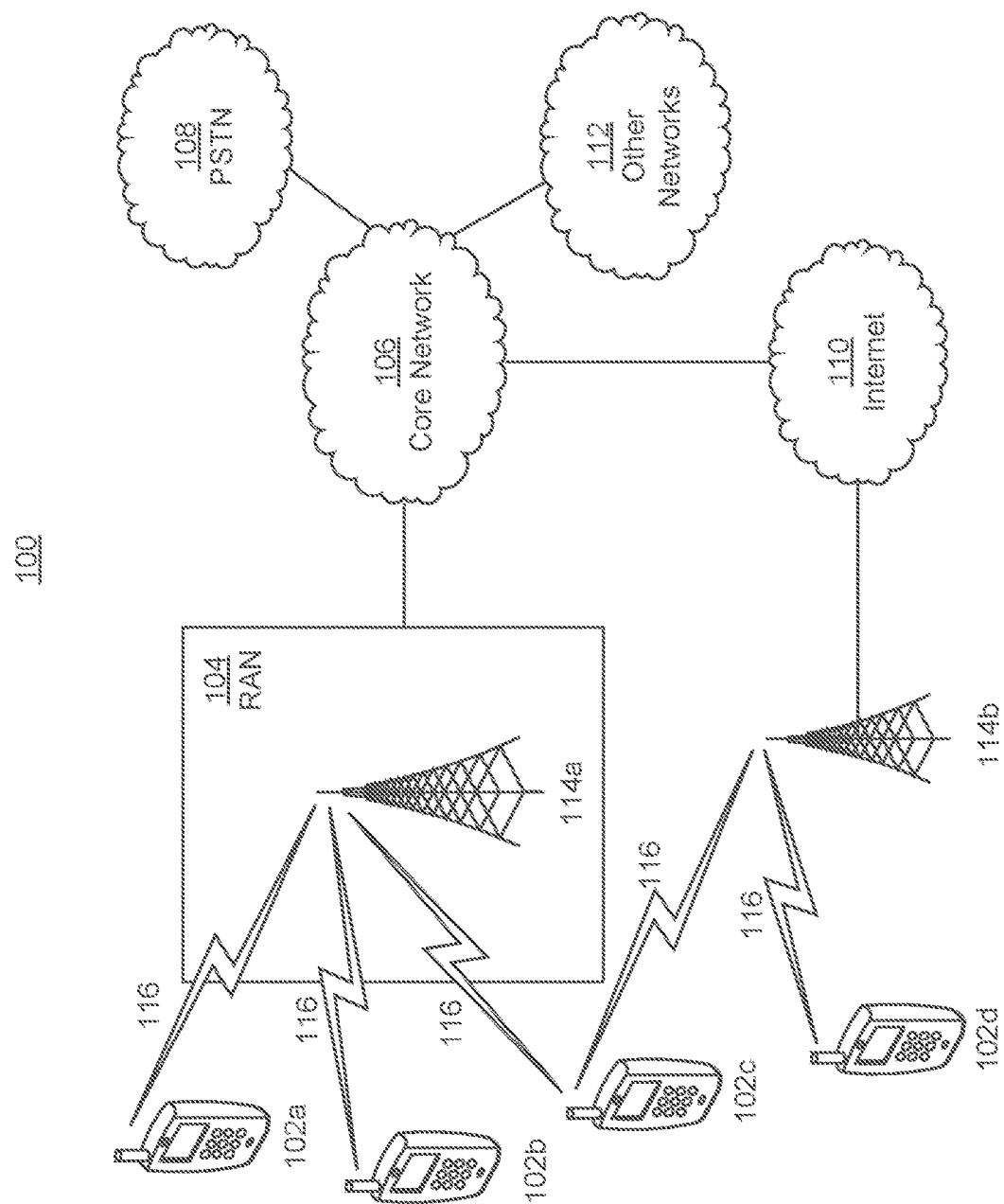
FIG. 19A is a system diagram illustrating an example communications system in which one or more disclosed embodiments may be implemented.

FIG. 19A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 19A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR ModeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 19A may be a wireless router, Home Node B, Home eNode B, or access point for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 19A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-pad calling, Internet connectivity, video distribution, etc., and/or perform high-level security functions, such as user authentication. Although not shown in FIG. 19A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 19A may be configured to communicate with the base station 114a, which may employ a cellular-based radio technology, and with the base station 114b, which may employ an IEEE 802 radio technology.

Figure 19B:
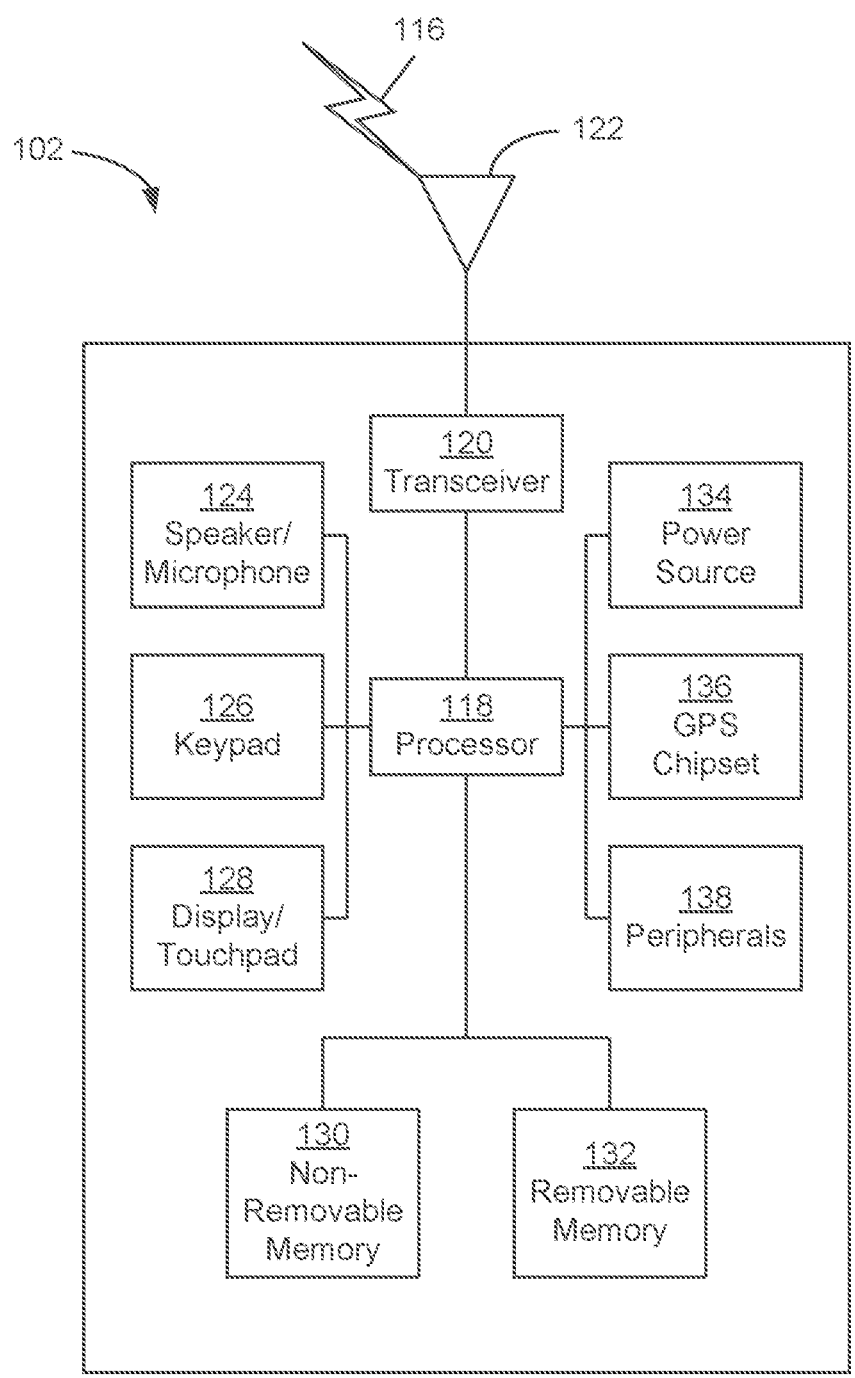
FIG. 19B is a system diagram illustrating an example wireless transmit/receive unit (WTRU) that may be used within the communications system illustrated in FIG. 19A according to an embodiment.

FIG. 19B is a system diagram illustrating an example WTRU 102. As shown in FIG. 19B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 19B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 19B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations, it will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 19C:
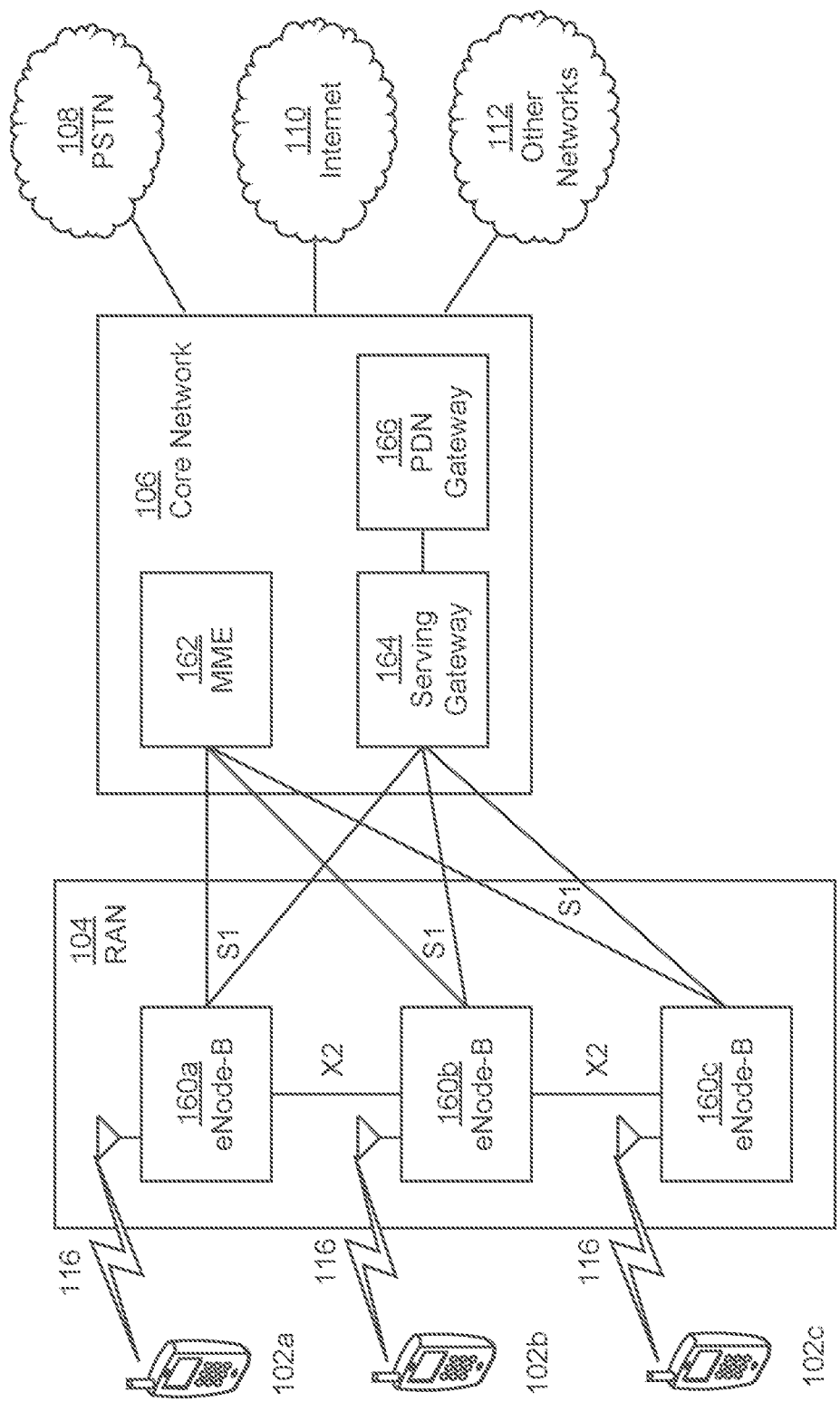
FIG. 19C is a system diagram illustrating an example radio access network (RAN) and an example core network (CN) that may be used within the communications system illustrated in FIG. 19A according to an embodiment.

FIG. 19C is a system diagram illustrating the RAN 104 and the ON 105 according to an embodiment. As noted above, the RAN 104 may employ an E-UTRA radio technology to communicate with the MRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 19C, the eNode-Bs 160a, 160b, 160c may communicate with one another over an X2 interface.

The CN 106 shown in FIG. 19C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108 in addition, the CN 106 may provide the WTRUs 102a, 102b, 102c with access to the other networks 112, which may include other wired and/or wireless networks that are owned and/or operated by other service providers.

Although the WTRU is described in FIGS. 19A-19D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel, if the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 80211ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capacities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode, in the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel, if the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 19D:
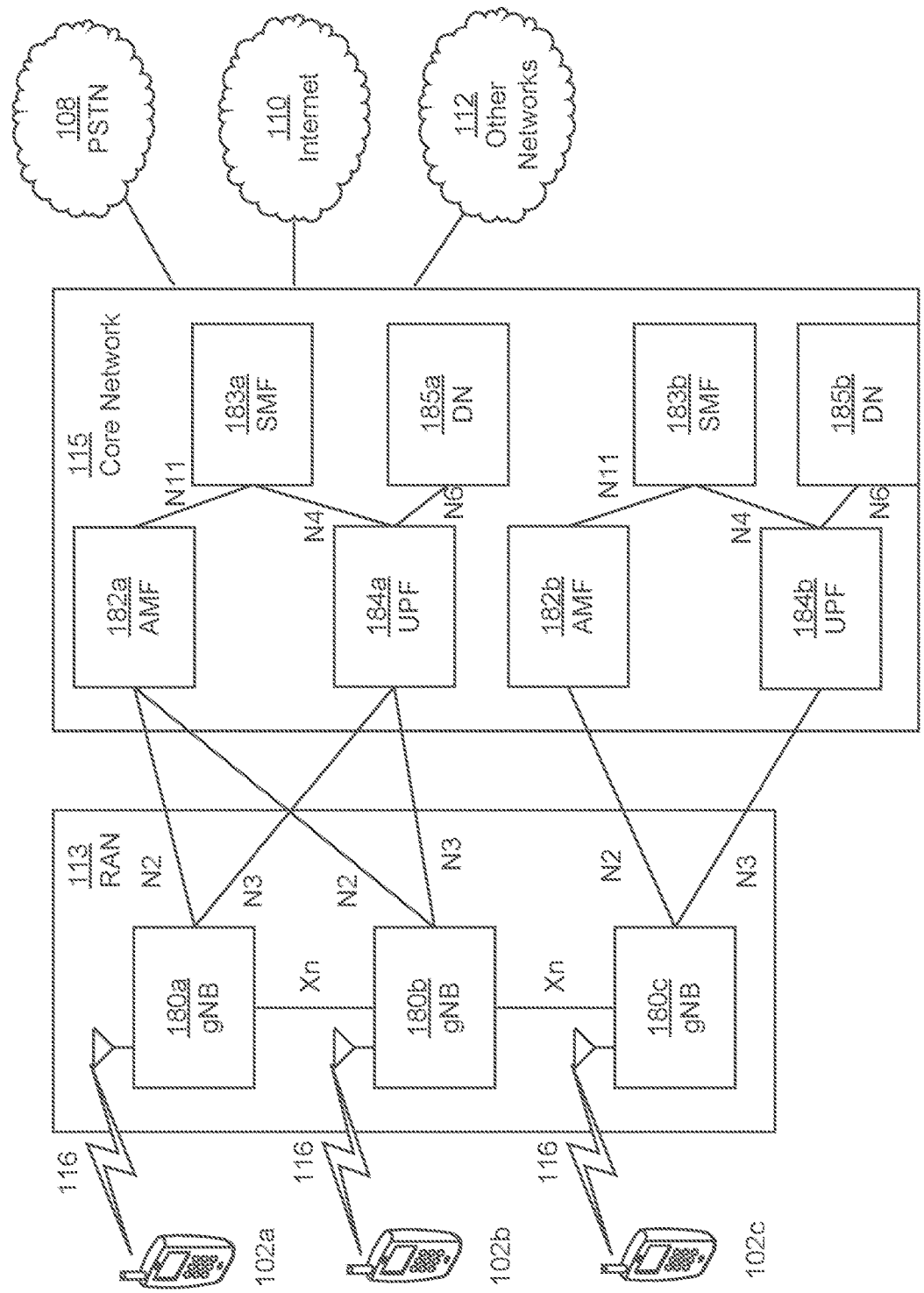
FIG. 19D is a system diagram illustrating a further example RAN and a further example CN that may be used within the communications system illustrated in FIG. 19A according to an embodiment.

FIG. 19D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 19D, the gNBs 180a, 180b, 180c may communicate with one another over an Xn interface.

The CN 115 shown in FIG. 19D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the MRUs 102a, 102b, 102c with access to the other networks 112, which may include other wired and/or wireless networks that are owned and/or operated by other service providers. In one embodiment the WTRUs 102a, 102b, 102c may be connected to a local Data Network (DN) 185a, 185b through the UPF 184a, 184b via the N3 interface to the UPF 184a, 184b and an N6 interface between the UPF 184a, 134b and the DN 185a, 185b.

In view of FIGS. 19A-19D, and the corresponding description of FIGS. 19A-19D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while bang temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although features and elements are described above m particular combinations, one of ordinary skill in the art will appreciate that each feature or element can be used alone or in any combination with the other features and elements, in addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for coding comprising:
obtaining a current coding unit (CU) in a video bitstream;
determining whether the current CU is bi-predicted;
based on a determination that the current CU is bi-predicted, identifying a first set of reference template samples neighboring a first temporal reference CU and a second set of reference template samples neighboring a second temporal reference CU, the first set of reference template samples and the second set of reference template samples corresponding to a set of template samples neighboring the current CU;
obtaining a set of bi-predicted reference template samples based on the identified first set of reference template samples and the identified second set of reference template samples;
obtaining a local illumination compensation (LIC) scaling factor based on the obtained set of bi-predicted reference template samples and the set of template samples for the current CU; and
obtaining an adjusted sample within the current CU based on the obtained LIC scaling factor.

2. The method of claim 1, wherein the current CU comprises a current block or a current sub-block.

3. The method of claim 1, wherein obtaining the set of bi-predicted reference template samples comprises averaging the first set of reference template samples neighboring the first temporal reference CU and the second set of reference template samples neighboring the second temporal reference CU.

4. The method of claim 1, wherein the first set of reference template samples neighboring the first temporal reference CU and the second set of reference template samples neighboring the second temporal reference CU are identified based on motion vectors of the current CU.

5. The method of claim 1, wherein the LIC scaling factor is obtained based on minimizing differences between the set of bi-predicted reference template samples and the set of template samples for the current CU.

6. The method of claim 5, wherein the differences between the set of bi-predicted reference template samples and the set of template samples for the current CU are minimized based on a least mean square error (LMSE) approach.

7. The method of claim 1, wherein the LIC scaling factor is obtained based on a linear model approach using a minimum value and a maximum value associated with the set of bi-predicted reference template samples and the set of template samples for the current CU.

8. The method of claim 1, further comprising:
determining whether a sub-block of the current CU is at a boundary of the current CU;
based on a determination that the sub-block of the current CU is at the boundary of the current CU, identifying a plurality of neighboring sub-blocks of the sub-block;
applying a plurality of motion vectors associated with the identified plurality of neighboring sub-blocks to a sample in the sub-block to derive a plurality of template reference samples;
obtaining an overlapped block motion compensation (OBMC) predicted sample based on the plurality of template reference samples; and
applying the obtained LIC scaling factor to the OBMC predicted sample.

9. The method of claim 1, wherein the set of template samples for the current CU comprises a set of neighboring samples of the current CU.

10. The method of claim 1, wherein an LIC parameter comprises the LIC scaling factor and an LIC offset, and wherein the method comprises obtaining the LIC offset based on obtained set of bi-predicted reference template samples and the set of template samples for the current CU.

11. A video coding device comprising:
a processor configured to:
obtain a current coding unit (CU) in a video bitstream;
determine whether the current CU is bi-predicted;
based on a determination that the current CU is bi-predicted, identify a first set of reference template samples neighboring a first temporal reference CU and a second set of reference template samples neighboring a second temporal reference CU, the first set of reference template samples and the second set of reference template samples corresponding to a set of template samples neighboring the current CU;
obtain a set of bi-predicted reference template samples based on the identified first set of reference template samples and the identified second set of reference template samples;
obtain a local illumination compensation (LIC) scaling factor based on the obtained set of bi-predicted reference template samples and the set of template samples for the current CU; and
obtain an adjusted sample within the current CU based on the obtained LIC scaling factor.

12. The video coding device of claim 11, wherein the current CU comprises a current block or a current sub-block.

13. The video coding device of claim 11, wherein the processor configured to obtain the set of bi-predicted reference template samples comprises the processor configured to average the first set of reference template samples neighboring the first temporal reference CU and the second set of reference template samples neighboring the second temporal reference CU.

14. The video coding device of claim 11, wherein the first set of reference template samples neighboring the first temporal reference CU and the second set of reference template samples neighboring the second temporal reference CU are identified based on motion vectors of the current CU.

15. The video coding device of claim 11, wherein the LIC scaling factor is obtained based on the processor configured to minimize differences between the set of bi-predicted reference template samples and the set of template samples for the current CU.

16. The video coding device of claim 15, wherein the differences between the set of bi-predicted reference template samples and the set of template samples for the current CU are minimized based on a least mean square error (LMSE) approach.

17. The video coding device of claim 11, wherein the LIC scaling factor is obtained based on the processor configured to use a linear model approach using a minimum value and a maximum value associated with the set of bi-predicted reference template samples and the set of template samples for the current CU.

18. The video coding device of claim 11, wherein the processor is further configured to:
- determine whether a sub-block of the current CU is at a boundary of the current CU;
- based on a determination that the sub-block of the current CU is at the boundary of the current CU, identify a plurality of neighboring sub-blocks of the sub-block;
- apply a plurality of motion vectors associated with the identified plurality of neighboring sub-blocks to a sample in the sub-block to derive a plurality of template reference samples;
- obtain an overlapped block motion compensation (OBMC) predicted sample based on the plurality of template reference samples; and
- apply the obtained LIC scaling factor to the OBMC predicted sample.

19. The video coding device of claim 11, wherein the set of template samples for the current CU comprises a set of neighboring samples of the current CU.

20. The video coding device of claim 11, wherein an LIC parameter comprises the LIC scaling factor and an LIC offset, and wherein the processor is configured to obtain the LIC offset based on obtained set of bi-predicted reference template samples and the set of template samples for the current CU.

* * * * *